United States Patent
Furuya

(10) Patent No.: US 12,053,917 B2
(45) Date of Patent: Aug. 6, 2024

(54) MOLDING MACHINE CONTROL SYSTEM

(71) Applicant: Seiko Epson Corporation, Tokyo (JP)

(72) Inventor: Shusaku Furuya, Miyada (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/748,075

(22) Filed: May 19, 2022

(65) Prior Publication Data
US 2022/0371247 A1 Nov. 24, 2022

(30) Foreign Application Priority Data
May 20, 2021 (JP) ................................. 2021-085140

(51) Int. Cl.
*B29C 45/76* (2006.01)

(52) U.S. Cl.
CPC .... *B29C 45/762* (2013.01); *B29C 2045/7606* (2013.01); *B29C 2945/76076* (2013.01); *B29C 2945/7617* (2013.01)

(58) Field of Classification Search
CPC .......... B29C 45/762; B29C 2045/7606; B29C 2945/76076; B29C 2945/7617; B29C 45/76; B29C 45/24
See application file for complete search history.

(56) References Cited

U.S. PATENT DOCUMENTS

| 5,792,395 | A  | * | 8/1998 | Ito ........................... B29C 45/76 264/40.5 |
| 6,514,440 | B1 | * | 2/2003 | Kazmer ................... B29C 45/77 264/328.8 |
| 7,374,413 | B2 | * | 5/2008 | Saito ....................... B29C 45/76 425/150 |

FOREIGN PATENT DOCUMENTS

JP 2011-167876 A 9/2011

* cited by examiner

*Primary Examiner* — Alison L Hindenlang
*Assistant Examiner* — Shibin Liang
(74) *Attorney, Agent, or Firm* — Harness, Dickey & Pierce, P.L.C.

(57) ABSTRACT

A molding machine control system includes a display section configured to display an operation item of an injection molding machine and an operation item of a peripheral equipment included in a setup operation of the injection molding machine, wherein the display section displays a first discriminatory indication configured to discriminate JOB 1 as a first job of the injection molding machine and JOB 2 as a second job of the injection molding machine, a progress situation of the operation item of the injection molding machine corresponding to JOB 1, a progress situation of the operation item of the peripheral equipment corresponding to JOB 1, a progress situation of the operation item of the injection molding machine corresponding to JOB 2, and a progress situation of the operation item of the peripheral equipment corresponding to JOB 2 in a view format.

8 Claims, 14 Drawing Sheets

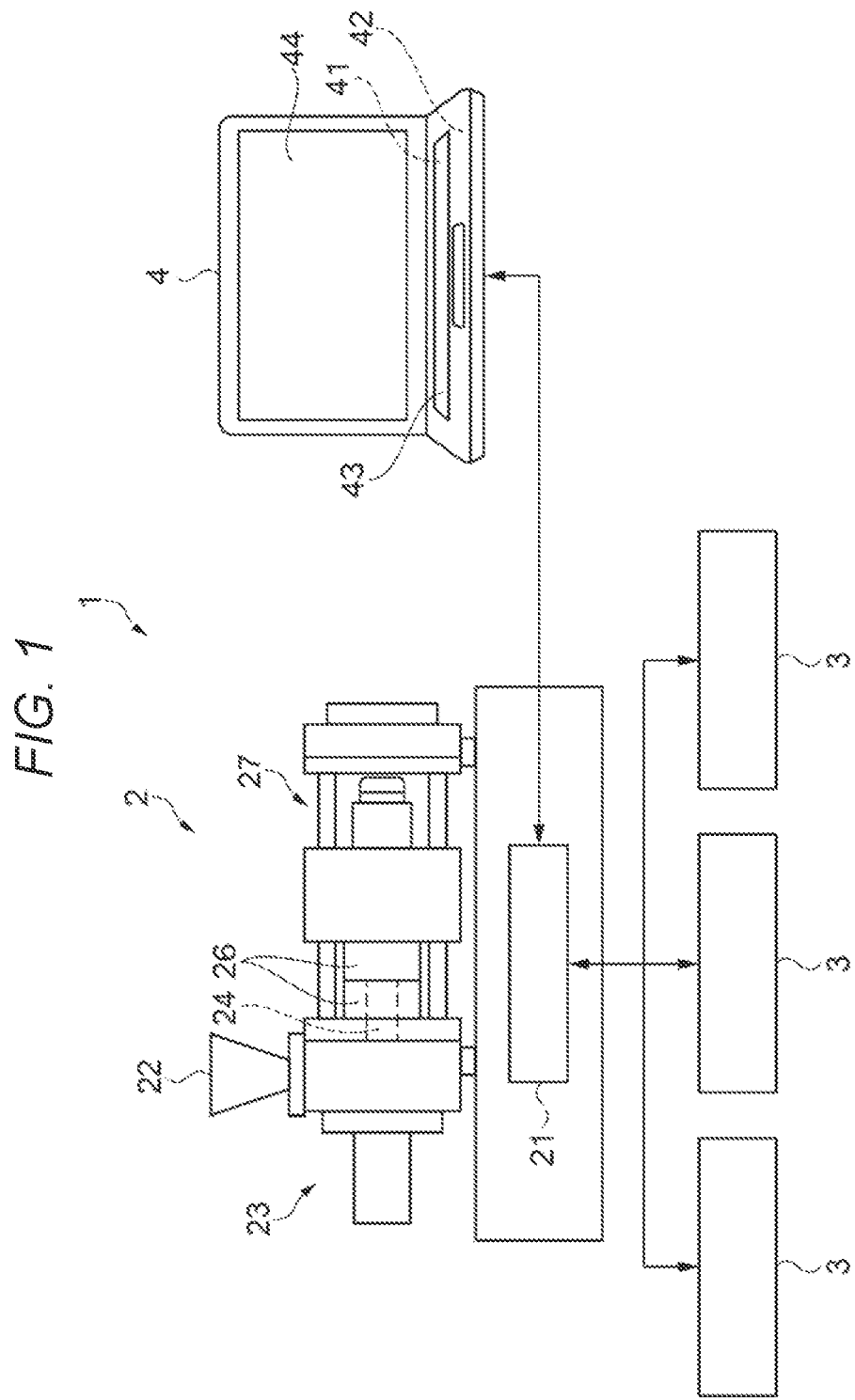

FIG. 2

| OPERATION TARGET | OPERATION ITEM | JOB 1 | JOB 2 | JOB 3 |
|---|---|---|---|---|
| PERIPHERAL EQUIPMENT | DRYING MATERIAL | PROGRESS RATE 80% SCHEDULED COMPLETION 15:00 ✓ | — | ▨ |
| PERIPHERAL EQUIPMENT | ATTACHING TEMPERATURE CONTROL MACHINE | PROGRESS RATE 66% SCHEDULED COMPLETION 15:00 ✓ | — | — |
| MOLDING MACHINE | RAISING TEMPERATURE OF MANIFOLD | ✓ | — | — |
| MOLDING MACHINE | PURGE ON RESIN CHANGE | ✓ | — | — |
| MOLDING MACHINE | RAISING TEMPERATURE OF HOPPER | PROGRESS RATE 10% SCHEDULED COMPLETION 15:20 | — | — |
| MOLDING MACHINE | LOWERING TEMPERATURE OF MANIFOLD | — | — | — |
| PERIPHERAL EQUIPMENT | RETRIEVING MOLDING CONDITIONS | — | — | — |
| MOLDING MACHINE | PURGE BEFORE PRODUCTION | — | — | — |
| MOLDING MACHINE | ATTACHING METAL MOLD | — | — | — |
| MOLDING MACHINE | RAISING TEMPERATURE OF METAL MOLD | — | — | — |
| MOLDING MACHINE | WASTE SHOT | — | — | — |

NAME OF MOLDING MACHINE: SMALL MOLDING MACHINE A
PROGRESS SITUATION OF SETUP

Buttons: JOB INFORMATION, INSPECTION, SETUP

Legend: ✓ COMPLETED, — TO BE PERFORMED, ▨ UNNECESSARY

FIG. 4

| NAME OF MOLDING MACHINE | SMALL MOLDING MACHINE A | | |
|---|---|---|---|
| JOB INFORMATION | | | |
| | JOB 1 | JOB 2 | JOB 3 |
| MOLDED ITEM | COMPONENT A | COMPONENT C | COMPONENT C |
| PLANNED VOLUME (pcs) | 5000 | 5000 | 5000 |
| ITEM OF MATERIAL 1 | MATERIAL A | MATERIAL C | MATERIAL C |
| NECESSARY QUANTITY OF MATERIAL 1 (kg) | 0.5 | 0.5 | 0.5 |
| ITEM OF MATERIAL 2 | MATERIAL B | MATERIAL D | MATERIAL D |
| NECESSARY QUANTITY OF MATERIAL 2 (kg) | 0.1 | 0.1 | 0.1 |

Buttons: JOB INFORMATION, INSPECTION, SETUP

FIG. 5

| OPERATION ITEM | JOB 1 | JOB 2 | JOB 3 |
|---|---|---|---|
| | PROGRESS RATE 80% SCHEDULED COMPLETION 15:00 | | |
| DRYING MATERIAL | | — | |
| ATTACHING TEMPERATURE CONTROL MACHINE | | — | — |
| | PROGRESS RATE 66% SCHEDULED COMPLETION | | |
| RAISING TEMPERATURE OF MANIFOLD | ✓ | — | — |
| PURGE ON RESIN CHANGE | ✓ | — | — |
| RAISING TEMPERATURE OF HOPPER | ✓ | — | — |
| | PROGRESS RATE 10% SCHEDULED COMPLETION 15:30 | | |
| LOWERING TEMPERATURE OF MANIFOLD | — | — | — |
| RETRIEVING MOLDING CONDITIONS | | — | — |
| PURGE BEFORE PRODUCTION | — | — | — |
| ATTACHING METAL MOLD | — | — | — |
| RAISING TEMPERATURE OF METAL MOLD | — | — | — |
| WASTE SHOT | — | — | — |

NAME OF MOLDING MACHINE: SMALL MOLDING MACHINE A
PROGRESS SITUATION OF SETUP

JOB INFORMATION · INSPECTION · SETUP

✓ COMPLETED  — TO BE PERFORMED  ▨ UNNECESSARY
▢ PERIPHERAL EQUIPMENT  ▢ MOLDING MACHINE

FIG. 6

| NAME OF MOLDING MACHINE | SMALL MOLDING MACHINE A | | | | | |
|---|---|---|---|---|---|---|
| PROGRESS SITUATION OF SETUP | | | JOB INFORMATION | INSPECTION | | SETUP |
| OPERATION TARGET | OPERATION ITEM | | JOB 1 | | JOB 2 | JOB 3 |
| PERIPHERAL EQUIPMENT | DRYING MATERIAL | | PROGRESS RATE 80% SCHEDULED COMPLETION 15:00 | | — | ▨ |
| PERIPHERAL EQUIPMENT | ATTACHING TEMPERATURE CONTROL MACHINE | | PROGRESS RATE 85% SCHEDULED COMPLETION 15:00 | | — | — |
| MOLDING MACHINE | RAISING TEMPERATURE OF MANIFOLD | | ≫ | | — | — |
| MOLDING MACHINE | PURGE ON RESIN CHANGE | | ≫ | | — | — |
| MOLDING MACHINE | RAISING TEMPERATURE OF HOPPER | | PROGRESS RATE 10% SCHEDULED COMPLETION 15:30 | | — | — |
| MOLDING MACHINE | LOWERING TEMPERATURE OF MANIFOLD | | — | | — | — |
| PERIPHERAL EQUIPMENT | RETRIEVING MOLDING CONDITIONS | | — | | — | — |
| MOLDING MACHINE | PURGE BEFORE PRODUCTION | | — | | — | — |
| MOLDING MACHINE | ATTACHING METAL MOLD | | — | | — | — |
| MOLDING MACHINE | RAISING TEMPERATURE OF METAL MOLD | | — | | — | — |
| MOLDING MACHINE | WASTE SHOT | | — | | — | — |

▨ COMPLETED    ▦ IN OPERATION    — TO BE PERFORMED    ▨ UNNECESSARY

| NAME OF MOLDING MACHINE | SMALL MOLDING MACHINE A | | JOB NAME | JOB 1 | | OPERATION ITEM | ATTACHING TEMPERATURE CONTROL MACHINE |

PROGRESS RATE (%) | 66 ▷

ENTER

CANCEL

FIG. 11

| NAME OF MOLDING MACHINE | SMALL MOLDING MACHINE A | | JOB INFORMATION | INSPECTION | SETUP |
|---|---|---|---|---|---|
| PROGRESS SITUATION OF SETUP | | | | | |
| PROCESS CLASS | OPERATION TARGET | OPERATION ITEM | JOB 1 | JOB 2 | JOB 3 |
| EXTERNAL SETUP | PERIPHERAL EQUIPMENT | DRYING MATERIAL | 5 PROGRESS RATE 80% SCHEDULED COMPLETION 15:00 | 5 | 5 |
| INTERNAL SETUP | PERIPHERAL EQUIPMENT | ATTACHING TEMPERATURE CONTROL MACHINE | PROGRESS RATE 85% SCHEDULED COMPLETION 15:00 | — | — |
| INTERNAL SETUP | MOLDING MACHINE | RAISING TEMPERATURE OF MANIFOLD | ✓ | — | — |
| INTERNAL SETUP | MOLDING MACHINE | PURGE ON RESIN CHANGE | ✓ | — | — |
| INTERNAL SETUP | MOLDING MACHINE | RAISING TEMPERATURE OF HOPPER | — | — | — |
| INTERNAL SETUP | MOLDING MACHINE | LOWERING TEMPERATURE OF MANIFOLD | PROGRESS RATE 10% SCHEDULED COMPLETION 15:30 | — | — |
| EXTERNAL SETUP | PERIPHERAL EQUIPMENT | RETRIEVING MOLDING CONDITIONS | — | — | — |
| INTERNAL SETUP | MOLDING MACHINE | PURGE BEFORE PRODUCTION | — | — | — |
| INTERNAL SETUP | MOLDING MACHINE | ATTACHING METAL MOLD | — | — | — |
| INTERNAL SETUP | MOLDING MACHINE | RAISING TEMPERATURE OF METAL MOLD | — | — | — |
| INTERNAL SETUP | MOLDING MACHINE | WASTE SHOT | — | — | — |

✓ COMPLETED   — TO BE PERFORMED   ▨ UNNECESSARY

FIG. 12

| NAME OF MOLDING MACHINE | SMALL MOLDING MACHINE A | | JOB INFORMATION | INSPECTION | SETUP |
|---|---|---|---|---|---|
| PROGRESS SITUATION OF SETUP | | | | | |

| OPERATION TARGET | OPERATION ITEM | JOB 1 | JOB 2 | JOB 3 |
|---|---|---|---|---|
| PERIPHERAL EQUIPMENT | DRYING MATERIAL | PROGRESS RATE 80% SCHEDULED COMPLETION 15:30 | | |
| PERIPHERAL EQUIPMENT | ATTACHING TEMPERATURE CONTROL MACHINE | PROGRESS RATE 66% SCHEDULED COMPLETION 15:30 | | |
| MOLDING MACHINE | RAISING TEMPERATURE OF MANIFOLD | ✓ | — | — |
| MOLDING MACHINE | PURGE ON RESIN CHANGE | ✓ | — | — |
| MOLDING MACHINE | RAISING TEMPERATURE OF HOPPER | ✓ | — | — |
| MOLDING MACHINE | LOWERING TEMPERATURE OF MANIFOLD | PROGRESS RATE 10% SCHEDULED COMPLETION 15:30 | — | — |
| PERIPHERAL EQUIPMENT | RETRIEVING MOLDING CONDITIONS | — | — | — |
| MOLDING MACHINE | PURGE BEFORE PRODUCTION | — | — | — |
| MOLDING MACHINE | ATTACHING METAL MOLD | — | — | — |
| MOLDING MACHINE | RAISING TEMPERATURE OF METAL MOLD | — | — | — |
| MOLDING MACHINE | WASTE SHOT | — | — | — |

EXTERNAL SETUP   INTERNAL SETUP   ✓ COMPLETED   — TO BE PERFORMED   ▨ UNNECESSARY

FIG. 14

| OPERATION TARGET | OPERATION ITEM | JOB 1 | JOB 2 | JOB 3 |
|---|---|---|---|---|
| PERIPHERAL EQUIPMENT | DRYING MATERIAL | PROGRESS RATE 80% SCHEDULED COMPLETION 15:00 | — | ▨ |
| PERIPHERAL EQUIPMENT | ATTACHING TEMPERATURE CONTROL MACHINE | PROGRESS RATE 66% SCHEDULED COMPLETION 15:30 | — | — |
| MOLDING MACHINE | RAISING TEMPERATURE OF MANIFOLD | ≫ | — | — |
| MOLDING MACHINE | PURGE ON RESIN CHANGE | ≫ | — | — |
| MOLDING MACHINE | RAISING TEMPERATURE OF HOPPER | PROGRESS RATE 10% SCHEDULED COMPLETION 16:00 | — | — |
| MOLDING MACHINE | LOWERING TEMPERATURE OF MANIFOLD | — | — | — |
| PERIPHERAL EQUIPMENT | RETRIEVING MOLDING CONDITIONS | — | — | — |
| MOLDING MACHINE | PURGE BEFORE PRODUCTION | — | — | — |
| MOLDING MACHINE | ATTACHING METAL MOLD | — | — | — |
| MOLDING MACHINE | RAISING TEMPERATURE OF METAL MOLD | — | — | — |
| MOLDING MACHINE | WASTE SHOT | — | — | — |
| MOLDING MACHINE | LOWERING TEMPERATURE OF METAL MOLD | — | — | — |
| MOLDING MACHINE | DETACHING METAL MOLD | — | — | — |

NAME OF MOLDING MACHINE: SMALL MOLDING MACHINE A

Buttons: JOB INFORMATION, INSPECTION, SETUP

Legend: □ PRE-SETUP OPERATION   ▨ POST-SETUP OPERATION   ✓ COMPLETED   — TO BE PERFORMED   ▨ UNNECESSARY

MOLDING MACHINE CONTROL SYSTEM

The present application is based on, and claims priority from JP Application Serial Number 2021-085140, filed May 20, 2021, the disclosure of which is hereby incorporated by reference herein in its entirety.

BACKGROUND

1. Technical Field

The present disclosure relates to a molding machine control system.

2. Related Art

In the past, as shown in JP-A-2011-167876 (Document 1), there has been known a setup support device for an injection molding machine which performs the following steps in the setup due to a start of production of the injection molding machine: displaying a setup screen on a display unit of a molding machine controller; displaying in an array a plurality of setup item buttons each displaying a setup item in a partial area of the setup screen; displaying in an array first state display parts respectively representing setup states of the setup items so as to correspond to the respective setup item buttons; and changing, when the setup item is selected by the setup item button, a display content of the first state display part corresponding to at least the setup item thus selected to a first display content. Further, in Document 1, as the setup items to be displayed by the setup support device for the injection molding machine, there are disclosed the setup items related to the injection molding machine such as metal mold attachment, mold clamp setting, and injection setting.

However, in general, a variety of types of peripheral equipment for aiding the injection molding machine are coupled to the injection molding machine, and the setup support device for the injection molding machine described in Document 1 is capable of figuring out the setup states of the setup items related to the injection molding machine, but is not capable of figuring out the setup states of the setup items related to the peripheral equipment. Further, the setup support device for the injection molding machine described in Document 1 is for displaying the setup screen when performing the setup due to the start of the production of the injection molding machine, and is capable of figuring out the setup states of the setup items corresponding to a certain job such as the production of a molded article based on a certain production plan, but is not capable of figuring out the setup states of the setup items corresponding to a subsequent job. Therefore, it is impossible for an operator to appropriately cope in accordance with the setup states of the peripheral equipment or the setup states of the subsequent job in the setup operation of the injection molding machine, and there is a possibility that the work efficiency decreases. Therefore, there has been demanded a setup support device capable of informing the operator of the setup states of the peripheral equipment or the setup states of the subsequent job in the setup operation of the injection molding machine.

SUMMARY

A molding machine control system is configured to control an injection molding machine, and peripheral equipment configured to aid the injection molding machine, the molding machine control system including a display section configured to display an operation item of the injection molding machine included in a setup operation of the injection molding machine, and an operation item of the peripheral equipment included in the setup operation of the injection molding machine, wherein the display section is configured to display a first discriminatory indication configured to discriminate a first job of the injection molding machine and a second job of the injection molding machine from each other, and display a progress situation of the operation item of the injection molding machine corresponding to the first job, a progress situation of the operation item of the peripheral equipment corresponding to the first job, a progress situation of the operation item of the injection molding machine corresponding to the second job, and a progress situation of the operation item of the peripheral equipment corresponding to the second job in a view format.

BRIEF DESCRIPTION OF THE DRAWINGS

FIG. 1 is an explanatory diagram of a molding machine control system according to Embodiment 1.

FIG. 2 is an explanatory diagram showing an example of a control screen displayed by a display section related to Embodiment 1.

FIG. 4 is an explanatory diagram showing an example of a job information screen displayed by the display section related to Embodiment 1.

FIG. 5 is an explanatory diagram showing an example of a control screen displayed by a display section related to Embodiment 2.

FIG. 6 is an explanatory diagram showing an example of a control screen displayed by a display section related to Embodiment 3.

FIG. 7 is an explanatory diagram showing an example of a control screen displayed by a display section related to Embodiment 4.

FIG. 8 is an explanatory diagram showing an example of a control screen displayed by a display section related to Embodiment 5.

FIG. 9 is an explanatory diagram showing an example of an input screen displayed by the display section related to Embodiment 5.

FIG. 11 is an explanatory diagram showing an example of a control screen displayed by a display section related to Embodiment 7.

FIG. 12 is an explanatory diagram showing an example of a control screen displayed by a display section related to Embodiment 8.

FIG. 14 is an explanatory diagram showing an example of a control screen displayed by a display section related to Embodiment 10.

DESCRIPTION OF EXEMPLARY EMBODIMENTS

1. Embodiment 1

Figure 3:
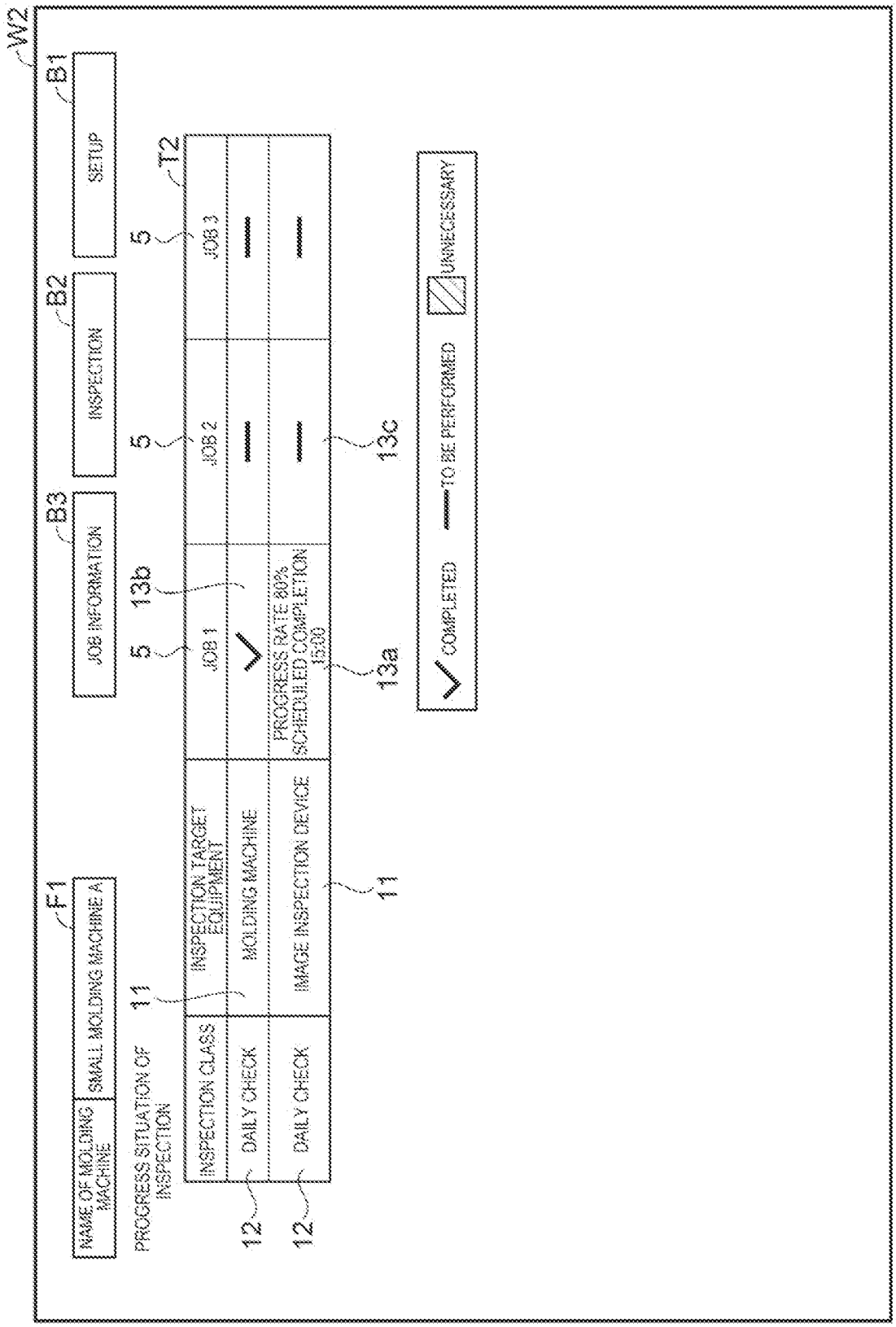
FIG. 3 is an explanatory diagram showing an example of an inspection screen displayed by the display section related to Embodiment 1.

A molding machine control system 1 according to Embodiment 1 will be described with reference to FIG. 1 through FIG. 4.

As shown in FIG. 1, the molding machine control system 1 is provided with a injection molding machine 2, peripheral equipment 3 for aiding the injection molding machine 2, and a control device 4. The injection molding machine 2 and the control device 4 are coupled to each other so as to be able to communicate with each other. The injection molding machine 2 and the peripheral equipment 3 are coupled to each other so as to be able to communicate with each other. Thus, the control device 4 and the peripheral equipment 3 are coupled to each other so as to be able to communicate with each other via the injection molding machine 2. It should be noted that in the present embodiment, the control device 4 and the peripheral equipment 3 are coupled to each other so as to be able to communicate with each other via the injection molding machine 2, but it is possible for the control device 4 and the peripheral equipment 3 to be coupled to each other so as to be able to communicate with each other without intervention of the injection molding machine 2. Further, the injection molding machine 2 and the peripheral equipment 3 are coupled to each other so as to be able to communicate with each other in the present embodiment, but are not required to be coupled to each other so as to be able to communicate with each other. Further, there is coupled just one injection molding machine 2 to the control device 4 so as to be able to communicate with each other in the present embodiment, but it is possible to couple two or more injection molding machines 2 to the control device 4 so as to be able to communicate with each other.

The injection molding machine 2 is provided with a molding controller 21, a hopper 22 as a material reservoir, an injector 23, a metal mold 26 having a cavity, and a mold clamper 27 for clamping the metal mold 26.

The hopper 22 retains the material in a state such as a pellet or powder, and feeds the material to the injector 23. In the present embodiment, the hopper 22 is provided with a heater not shown. The heater not shown provided to the hopper 22 is used for preventing moisture absorption of the material retained in the hopper 22 to keep a dry condition of the material retained in the hopper 22.

The injector 23 is provided with an impeller not shown having a shape of a vortex type, a screw type, or the like, the heater not shown, and a manifold 24. The impeller and the heater provided to the injector 23 plasticize the material fed from the hopper 22 to the injector 23. The manifold 24 is block made of metal provided with a flow channel not shown, and derivers the material thus plasticized by the impeller and the heater to the metal mold 26 via the channel. In the present embodiment, the manifold 24 includes a heater not shown and a hot runner nozzle not shown. The injector 23 plasticizes the material fed from the hopper 22, and then injects the predetermined amount of the material thus plasticized to the metal mold 26 via the manifold 24.

The metal mold 26 has the cavity as a space filled with the material injected from the injector 23.

The mold clamper 27 claps the metal mold 26 so that the metal mold 26 does not open due to the fill pressure when filling the cavity with the material injected from the injector 23.

The molding controller 21 has a function of controlling an overall operation of the injection molding machine 2 to execute the injection molding, and a function of communicating with the peripheral equipment 3 and the control device 4 via an interface not shown.

In accordance with a molding program, the molding controller 21 controls the injector 23 to inject the material fed from the hopper 22 to the injector 23 to the metal mold 26, and controls the mold clamper 27 to clamp the metal mold to thereby mold a molded article having a shape corresponding to the shape of the cavity of the metal mold 26.

The molding program is a program for performing the injection molding once in the injection molding machine 2, and molding conditions such as a change timing of control values of the injector 23, the mold clamper 27, and so on and levels of the control values are designated in the molding program.

The molding controller 21 executes the molding program the number of times corresponding to the scheduled production number set in advance in the production plan of the molded article to be produced by the injection molding machine to perform the injection molding to thereby mold the corresponding number of molded articles to the scheduled production number. It should be noted that in the present embodiment, a single injection molding cycle is referred to as a shot, and a unit time from when a single injection molding cycle starts to when the single injection molding cycle ends is referred to as a cycle time (sec/shot). Further, executing the molding program the corresponding number of times to the scheduled production number to mold the scheduled number of molded articles is referred to as a job.

Further, the molding controller 21 has a function of obtaining a variety of types of time-series data related to the injection molding using a variety of sensors not shown provided to the injection molding machine 2. As the variety of sensors, there can be cited, for example, a weight sensor for detecting a weight of the material retained in the hopper 22, a pressure sensor for detecting pressure of a gas in the injector 23, the material in the metal mold 26, or the like, and a temperature sensor for detecting the temperature of the injector 23, the metal mold 26, or the like. It should be noted that the time-series data means data which can be obtained by continuously or intermittently acquiring the detection values of the variety of sensors in a predetermined period. Such acquisition of the variety of time-series data is an operation performed in any injection molding machine, and therefore, the detailed description thereof will be omitted.

The variety of time-series data related to the injection molding obtained by the molding controller 21 are transmitted from the molding controller 21 to the control device 4.

The peripheral equipment 3 is equipment for aiding the injection molding machine 2. As the peripheral equipment 3, there can be cited, for example, a drying machine, a temperature control machine, an inspection device, a processing machine, and a conveying device.

The drying machine is used for dehumidifying and drying the material before feeding the material to the injection molding machine 2. The temperature control machine is used for controlling the temperature of the metal mold 26. The inspection device is, for example, an image inspection device, and is used for determining presence or absence of abnormalities in exterior appearance for each molded article by an appearance inspection using an image of the molded article. The processing machine is used for removing burrs and so on of the molded article. The conveying device is, for example, a robotic arm, and is used for detaching the molded article from the metal mold 26, and conveying the molded article to the processing machine or the like.

To such peripheral equipment 3, there are provided a variety of sensors not shown for detecting an operational situation of the peripheral equipment 3. For example, the drying machine or the temperature control machine as the peripheral equipment 3 is provided with a temperature sensor for detecting the temperature in the drying machine or the temperature of a thermal medium of the temperature control machine. The time-series data related to the operational situation of the peripheral equipment 3 obtained by the variety of sensors provided to the peripheral equipment 3 are transmitted to the molding controller 21 of the injection molding machine 2 via an interface not shown. Then, the variety of time-series data related to the operational situation of the peripheral equipment 3 are transmitted from the molding controller 21 to the control device 4.

It should be noted that such peripheral equipment 3 and the injection molding machine 2 are configured as devices independent of each other in the present embodiment, but the peripheral equipment 3 and the injection molding machine 2 can also be configured integrally with each other.

Further, as the peripheral equipment 3, there can also be cited, for example, an information processing device provided with a database assembled by accumulating the molding conditions of the molded items which the injection molding machine 2 produced in the past. It is possible for the operator to retrieve the molding conditions corresponding to the molded item the production of which is planned from the database using such an information processing device provided with the database accumulating the molding conditions of each of the molded items, and then perform setting of the molding conditions and generation of the molding program. Further, the information processing device as such peripheral equipment 3 is capable of transmitting the molding conditions retrieved from the database and the molding program generated based on the molding conditions to the injection molding machine 2 and the control device 4.

It should be noted that the information processing device as such peripheral equipment 3, the injection molding machine 2, and the control device 4 are configured as devices independent of each other in the present embodiment, but the information processing device as the peripheral equipment 3, and the injection molding machine 2 or the control device 4 can also be configured integrally with each other.

The control device 4 is provided with a controller 41, a storage section 42, an operation section 43, and a display section 44. As the control device 4, it is possible to use an information processing device such as a computer. The control device 4 is independently disposed separately from the injection molding machine 2 in the present embodiment, but is not required to be independently disposed separately from the injection molding machine 2, and it is possible for the control device 4 and the injection molding machine 2 to be configured integrally with each other. The molding control system 1 can be realized by using, for example, the molding controller 21 originally provided to the injection molding machine 2, and a display section, an operation section, and a storage section each not shown and originally provided to the injection molding machine 2 as the control device 4.

The controller 41 has a function of receiving the variety of time-series data related to the injection molding transmitted from the injection molding machine 2, and the variety of time-series data related to the operational situation of the peripheral equipment 3 transmitted from the peripheral equipment 3, and then storing in the storage section 42, a function of starting up a setup aiding program stored in advance in the storage section 42 to thereby control the display section 44 to display a control screen for aiding the setup operation of the injection molding machine 2 and the like on the display section 44, and a function of calculating progress situation of each of the variety of operation items included in the setup operation of the injection molding machine 2 and so on.

As the controller 41, it is possible to use an integrated circuit such as a CPU (Central Processing Unit) or an MPU (Micro Processing Unit).

The storage section 42 stores the variety of time-series data related to the injection molding, the variety of time-series data related to the operational situation of the peripheral equipment 3, the setup aiding program for displaying the control screen and so on for aiding the setup operation of the injection molding machine 2 on the display section 44, and the data to be used for calculating the progress situation of each of the variety of operation items included in the setup operation of the injection molding machine 2. The data to be used for calculating the progress situation of each of the variety of operation items included in the setup operation of the injection molding machine 2 means, for example, a standard operation time of each of the variety of operation items.

As the storage section 42, there can be used a volatile memory such as a RAM (Random Access Memory), a nonvolatile memory such as a ROM (Read Only Memory), and a removable external storage device.

The operation section 43 transmits an operation signal to the controller 41 based on an input operation, a selection operation, a screen transition operation, and so on by the operator. The controller 41 performs a variety of types of processing such as changing the display content of the display section 44 based on the operation signal from the operation section 43.

As the operation section 43, there can be used, for example, a keyboard, a mouse, or a touch panel.

The display section 44 displays, under the control of the controller 41, a variety of screens such as a control screen for aiding the setup operation of the injection molding machine 2, or an input screen for the operator to input the operational situation of each of the injection molding machine 2 and the peripheral equipment 3.

As the display section 44, there can be used, for example, a liquid crystal display. It should be noted that it is also possible for the display section 44 and the operation section 43 to be integrated with each other as in the case of a touch panel display.

Then, a control screen W1 displayed by the display section 44 will be described with reference to FIG. 2.

As shown in FIG. 2, the display section 44 displays the control screen W1 for aiding the setup operation of the injection molding machine 2. It is possible for the operator to figure out the progress situation of the setup operation of the injection molding machine 2 by viewing the control screen W1. It should be noted that regarding a variety of character strings and numerical values in FIG. 2, character strings and numerical values different from actual ones are displayed in some cases in order to describe the present disclosure easy to understand.

It should be noted that in the present disclosure, the "setup" is an operation other than molding of the molded articles out of the operations occurring for performing molding of the molded articles, and is a concept including a pre-setup which is performed before molding of the molded articles and a post-setup which is performed after molding of the molded articles. Further, the "setup" includes operations which the operator performs on the peripheral equipment 3 besides the operations which the operator performs on the injection molding machine 2. The operations which the operator performs on the peripheral equipment 3 include operations executed by the peripheral equipment 3 operating, such as drying of the material described later.

The control screen W1 includes a table T1 for displaying the variety of operation items included in a setup operation 6 of the injection molding machine 2 and the progress state of each of the operation items in a view format, a molding machine selection field F1 for selecting the injection molding machine 2 which the operator controls, and a setup button B1, an inspection button B2, and a job information button B3 as buttons for switching the screen to be displayed by the display section 44. The variety of operation items included in the setup operation 6 of the injection molding machine 2 include operation items 6a of the injection molding machine 2 which the operator performs on the injection molding machine 2, and operation items 6b of the peripheral equipment 3 which the operator performs on the peripheral equipment 3.

By the operator selecting the setup button B1, the display section 44 displays the control screen W1 for displaying the progress state of the setup operation 6 of the injection molding machine 2. Further, as described later, by the operator selecting the inspection button B2 or the job information button B3, the display section 44 displays the screen for displaying the progress situation of the inspection operation or the screen for displaying the job information in accordance with the button selected by the operator.

In the present embodiment, the operator operates the operation section 43 of the control device 4 to input a name of the injection molding machine 2 which the operator controls in the molding machine selection field F1. The display section 44 displays, as the table T1, the progress situation of the operation items 6a, 6b included in the setup operation 6 of the injection molding machine 2 input to the molding machine selection field F1.

Then, the table T1 will specifically be described.

It should be noted that the table T1 is an example of displaying the operation items 6a of the injection molding machine 2, the operation items 6b of the peripheral equipment 3, the progress situation of each of the operation items 6a of the injection molding machine 2, and the progress situation of each of the operation items 6b of the peripheral equipment 3 in a view format.

In the present embodiment, in a row located at the head of the table T1, there are displayed first discriminatory indications 5 for discriminating a first job of the injection molding machine 2 and a second job of the injection molding machine 2 from each other. In a column located at a table side in the table T1, there are displayed the operation items 6a of the injection molding machine 2 included in the setup operation 6 of the injection molding machine 2, and the operation items 6b of the peripheral equipment 3 included in the setup operation 6 of the injection molding machine 2. In the table body of the table T1, in a cell where a row and a column cross each other, there is displayed a progress situation. Further, in a column which is adjacent to the table at an opposite side to the table body in the table T1, there are displayed second discriminatory indications 10 for discriminating the operation items 6a of the injection molding machine 2 and the operation items 6b of the peripheral equipment 3 from each other. The second discriminatory indications 10 will be described later.

It should be noted that it is possible to display the operation items 6a of the injection molding machine 2 and the operation items 6b of the peripheral equipment 3 in a row located at the head of the table T1, and display the first discriminatory indications 5 in the column located at the table side in the table T1.

The first discriminatory indications 5 displayed in the row located at the head of the table T1 will be described.

The first discriminatory indications 5 for discriminating the first job of the injection molding machine 2 and the second job of the injection molding machine 2 from each other are each, for example, a name of the job to be performed by the injection molding machine 2. In the present embodiment, the names of the jobs to be performed by the injection molding machine 2 are "JOB 1," "JOB 2," and "JOB 3" in the order in which the injection molding machine 2 performs the jobs. JOB 1 is a job the setup operation 6 of which is currently performed, JOB 2 is a job the production of the molded articles of which is planned to be performed subsequently to JOB 1, and JOB 3 is a job the production of the molded articles of which is planned to be performed subsequently to JOB 2. In the row located at the head of the table T1, there are arranged JOB 1, JOB 2, and JOB 3 as the first discriminatory indications 5 in the order in which the injection molding machine 2 performs the jobs, namely in chronological order. It should be noted that there are displayed the three jobs, namely JOB 1, JOB 2, and JOB 3 as the first discriminatory indications 5 in the present embodiment, but the number of the first discriminatory indications 5 can be two, or can also be four or more. Further, the first discriminatory indications 5 are not limited to the names of the jobs, and can also be, for example, molded items to be produced in the respective jobs.

The operation items 6a, 6b included in the setup operation 6 of the injection molding machine 2 displayed in the column located at the table side in the table T1 will be described.

In the column located at the table side in the table T1, as the operation items 6a of the injection molding machine 2 and the operation items 6b of the peripheral equipment 3, "DRYING MATERIAL," "ATTACHING TEMPERATURE CONTROL MACHINE," "RAISING TEMPERATURE OF MANIFOLD," "PURGE ON RESIN CHANGE," "RAISING TEMPERATURE OF HOPPER," "LOWERING TEMPERATURE OF MANIFOLD," "RETRIEVING MOLDING CONDITIONS," "PURGE BEFORE PRODUCTION," "ATTACHING METAL MOLD," "RAISING TEMPERATURE OF METAL MOLD," and "WASTE SHOT" are arranged in the order in which the operator performs the setup operation 6, namely in the chronological order.

DRYING MATERIAL is an operation of drying the material of the molded article molded by the injection molding machine 2 with the drying machine as the peripheral equipment 3. ATTACHING TEMPERATURE CONTROL MACHINE is an operation of arranging the temperature control machine as the peripheral equipment 3 for performing the temperature control of the metal mold 26 in the vicinity of the injection molding machine 2, and performing the temperature control of a heat medium of the temperature control machine. RAISING TEMPERATURE OF MANIFOLD is an operation of raising the temperature of the manifold 24 of the injection molding machine 2 before PURGE ON RESIN CHANGE. PURGE ON RESIN CHANGE is an operation of cleansing the inside of the injection molding machine 2 such as an impeller and a flow channel in the manifold 24 using a purge material or the like as a cleanser for the molding machine. RAISING TEMPERATURE OF HOPPER is an operation of raising the temperature of the heater provided to the hopper 22 of the injection molding machine 2 in order to dry the material retained in the hopper 22. LOWERING TEMPERATURE OF MANIFOLD is an operation of lowering the temperature of the manifold 24 before ATTACHING METAL MOLD to reduce the thermal expansion of the manifold 24. RETRIEVING MOLDING CONDITIONS is an operation of retrieving the molding conditions of the molded article produced by the injection molding machine 2 from the database provided to the information processing device as the peripheral equipment 3. PURGE BEFORE PRODUCTION is an operation of discharging the purge material remaining inside the injection molding machine 2 and the material which is retained inside the injection molding machine 2 to thereby be thermally deteriorated from the injection molding machine 2, and thus, replacing the inside of the injection molding machine 2 with the fresh material. ATTACHING METAL MOLD is an operation of attaching the metal mold 26 to the injection molding machine 2. RAISING TEMPERATURE OF METAL MOLD is an operation of coupling a pipe for circulating the heat medium of the temperature control machine to the metal mold 26 to raise the temperature of the metal mold 26 before molding the molded article. WASTE SHOT is an operation of molding a sample of the molded article which is not assembled as a non-defective product but is discarded until the quality of the molded article stabilizes.

It should be noted in the present embodiment, DRYING MATERIAL, ATTACHING TEMPERATURE CONTROL MACHINE, RAISING TEMPERATURE OF MANIFOLD, PURGE ON RESIN CHANGE, RAISING TEMPERATURE OF HOPPER, LOWERING TEMPERATURE OF MANIFOLD, RETRIEVING MOLDING CONDITIONS, PURGE BEFORE PRODUCTION, ATTACHING METAL MOLD, RAISING TEMPERATURE OF METAL MOLD, and WASTE SHOT as the operation items 6a, 6b displayed in the column located at the table side of the table T1 are an example of the operations included in the setup operation 6 of the injection molding machine 2. As the operation items 6a, 6b, some of these operations are not required to be displayed, and it is possible to arrange that the operation included in the setup operation 6 of the injection molding machine 2 other than these operations is displayed in the table T1. Further, in the present embodiment, the operation items 6a, 6b displayed in the column located at the table side in the table T1 are the operations corresponding to a pre-setup out of the setup operation 6, but it is possible to include the operation corresponding to a post-setup.

The progress situation displayed in the cell where a row and a column cross each other in the table body of the table T1 will be described.

For example, out of the cells displayed in the table body of the table T1, in a cell 7a where the column of JOB 1 as the first job out of the first discriminatory indications 5 and the row of DRYING MATERIAL out of the operation items 6a, 6b cross each other, there is displayed the progress situation of DRYING MATERIAL corresponding to JOB 1. Since DRYING MATERIAL corresponding to JOB 1 is an operation in operation, a progress rate of DRYING MATERIAL corresponding to JOB 1, and a scheduled completion time of DRYING MATERIAL corresponding to JOB 1 are displayed in the cell 7a.

Similarly, the progress situation of ATTACHING TEMPERATURE CONTROL MACHINE corresponding to JOB 1 is displayed in a cell 7b, and the progress situation of LOWERING TEMPERATURE OF MANIFOLD corresponding to JOB 1 is displayed in a cell 7c. Since ATTACHING TEMPERATURE CONTROL MACHINE corresponding to JOB 1 and LOWERING TEMPERATURE OF MANIFOLD corresponding to JOB 1 are the operations in operation, the progress rates and the scheduled completion times of the operations are displayed in the cells 7b, 7c, respectively.

Out of the cells displayed in the table body of the table T1, in a cell 7d, there is displayed the progress situation of RAISING TEMPERATURE OF HOPPER corresponding to JOB 1. Since RAISING TEMPERATURE OF HOPPER corresponding to JOB 1 is an operation execution of which is complete, there is displayed a check mark as a symbol representing the completion of the execution.

Out of the cells displayed in the table body of the table T1, in a cell 7e, there is displayed the progress situation of WASTE SHOT corresponding to JOB 1. Since WASTE SHOT corresponding to JOB 1 is an operation to be performed, there is displayed a hyphen as a symbol representing an operation to be performed. Similarly, the progress situation of ATTACHING TEMPERATURE CONTROL MACHINE corresponding to JOB 2 as the second job is displayed in a cell 7f, and the progress situation of PURGE ON RESIN CHANGE corresponding to JOB 2 is displayed in a cell 7g. Since ATTACHING TEMPERATURE CONTROL MACHINE corresponding to JOB 2 and PURGE ON RESIN CHANGE corresponding to JOB 2 are the operations to be performed, the hyphen as the symbol representing the operation to be performed is displayed in the cell 7f and the cell 7g.

Further, out of the cells displayed in the table body of the table T1, a cell 7h is a cell showing DRYING MATERIAL corresponding to JOB 3. In the present embodiment, DRYING MATERIAL corresponding to JOB 3 is an operation unnecessary to perform. In order to show the fact that DRYING MATERIAL corresponding to JOB 3 is the operation unnecessary to perform, hatching with positive slope is used as a background of the cell 7h to make the cell 7h different in display configuration from other cells. It should be noted that JOB 3 corresponds to the second job when assuming JOB 2 as the first job.

By the display section 44 displaying the table T1 in the control screen W1 in such a manner, it is possible to display the progress situation of the operation item 6a of the injection molding machine 2 corresponding to JOB 1 as the first job, the progress situation of the operation item 6b of the peripheral equipment 3 corresponding to JOB 1, the progress situation of the operation item 6a of the injection molding machine 2 corresponding to JOB 2 as the second job, and the progress situation of the operation item 6b of the peripheral equipment 3 corresponding to JOB 2 in a view format. Thus, it is possible to provide the molding machine control system 1 which is capable of making the operator not only know the progress situation of the operation item 6a of the injection molding machine 2, but also know the progress situation of the operation item 6b of the peripheral equipment 3 in the setup operation 6 of the injection molding machine 2. Further, it is possible to provide the molding machine control system 1 which is capable of making the operator not only know the setup operation 6 corresponding to JOB 1, but also know the setup operation 6 of JOB 2 in which the production of the molded article is planned to be performed subsequently to JOB 1. Due to this molding machine control system 1, since it is possible for the operator to appropriately cope in accordance with the setup state of the peripheral equipment 3 and the progress situation of the setup operation 6 of the subsequent job in the setup operation 6 of the injection molding machine 2, the work efficiency increases.

It should be noted that although the progress situation of the operation item 6a of the injection molding machine 2 and the progress situation of the operation item 6b of the peripheral equipment 3 are displayed using the numerical values representing the progress rate, and the symbols such as the check mark and the hyphen in the present embodiment, the indications representing the progress situation are not limited thereto. For example, it is possible to display the progress situation using character strings such as "TO BE PREFORMED," "IN OPERATION," and "COMPLETED."

Although the progress rate and the scheduled completion time are displayed as the progress situation with respect to the operation in operation out of the operation items 6a of the injection molding machine 2 in the present embodiment, it is possible to arrange that either one thereof is displayed. Similarly, although the progress rate and the scheduled completion time are displayed as the progress rate with respect to the operation in operation out of the operation items 6b of the peripheral equipment 3 in the present embodiment, it is possible to arrange that either one thereof is displayed.

Although the progress rate of the operation item 6a of the injection molding machine 2 and the progress rate of the operation item 6b of the peripheral equipment 3 are displayed with the numerical value in the present embodiment, it is possible to adopt a graphical indication such as a bar graph or a pie chart.

It should be noted that the progress rate of the operation item 6a of the injection molding machine 2 and the progress rate of the operation item 6b of the peripheral equipment 3 can be calculated by, for example, (elapsed time from the start of the operation of the operation item 6a, 6b to the present)/(standard operation time of the operation item 6a, 6b). The elapsed time from the start of the operation of the operation item 6a, 6b to the present can be obtained by, for example, the controller 41 of the control device 4 detecting the fact that the operator has started the input related to the operation of the operation item 6a, 6b using the operation section not shown provided to the injection molding machine 2 and the peripheral equipment 3, and the controller 41 measuring the time from the time point when the operator has started the input related to the operation of the operation item 6a, 6b to the present.

Further, the progress rate of the operation item 6a of the injection molding machine 2 and the progress rate of the operation item 6b of the peripheral equipment 3 can be calculated based on, for example, detection values detected by a variety of sensors not shown provided to the injection molding machine 2 and the peripheral equipment 3.

Out of the operation items 6a, 6b, in RAISING TEMPERATURE OF HOPPER, RAISING TEMPERATURE OF MANIFOLD, LOWERING TEMPERATURE OF MANIFOLD, and RAISING TEMPERATURE OF METAL MOLD, it is possible to calculate the progress rate by detecting the temperature of the hopper 22, the manifold 24, and the metal mold 26 using the sensors not shown in each of the operation items 6a, 6b. For example, in RAISING TEMPERATURE OF HOPPER, the progress rate of RAISING TEMPERATURE OF HOPPER can be calculated by ((the current temperature of the hopper 22)-(the temperature of the hopper 22 when starting RAISING TEMPERATURE OF HOPPER))/((a preset temperature of the hopper 22 in RAISING TEMPERATURE OF HOPPER)-(the temperature of the hopper 22 when starting RAISING TEMPERATURE OF HOPPER)). In a similar manner, in RAISING TEMPERATURE OF MANIFOLD, LOWERING TEMPERATURE OF MANIFOLD, and RAISING TEMPERATURE OF METAL MOLD, it is possible to calculate the progress rate of each of the operations from the current temperature of the manifold 24, or the metal mold 26, the preset temperature set in advance by the operator in each of the operations, and the temperature of the manifold 24 or the metal mold 26 when starting each of the operations.

Out of the operation items 6a, 6b, in PURGE ON RESIN CHANGE and PURGE BEFORE PRODUCTION, by detecting the weight of the purge material or the material of the molded article discharged from the injector 23 of the injection molding machine 2 using the sensor not shown in each of the operation items 6a, 6b, it is possible to calculate the progress rate. For example, it is possible to calculate the progress rate by (the weight of the purge material or the material of the molded article discharged from the injector 23)/(a preset value set in advance by the operator as the weight of the purge material of the material of the molded article discharged from the injector 23).

Out of the operation items 6a, 6b, in WASTE SHOT, by the sensor not shown disposed in the injector 23 detecting the gas pressure in the injector 23, it is possible to calculate the progress rate based on the degree of the variation of the gas pressure in the injector 23.

Then, the second discriminatory indications 10 for discriminating the operation items 6a of the injection molding machine 2 and the operation items 6b of the peripheral equipment 3 from each other will be described.

The second discriminatory indications 10 are disposed for clearly showing whether each of the operation items 6a of the injection molding machine 2 and the operation items 6b of the peripheral equipment 3 displayed at the table side of the table T1 is the operation on the injection molding machine 2 or the operation on the peripheral equipment 3 to the operator. In the present embodiment, the second discriminatory indications 10 correspond to the class of equipment which the operator takes as an operation target in the operation items 6a, 6b. Specifically, the display section displays the two classes, namely "MOLDING MACHINE" representing the injection molding machine 2, and "PERIPHERAL EQUIPMENT" representing the peripheral equipment 3, as the second discriminatory indications 10.

By the display section 44 displaying the second discriminatory indications 10 in the table T1, it is possible for the operator to easily understand whether each of the operation items 6a, 6b displayed at the table side of the table T1 is the operation on the injection molding machine 2, or the operation on the peripheral equipment 3. Thus, the work efficiency of the operator increases. It should be noted that it is possible to adopt an indication other than the two classes of "MOLDING MACHINE" and "PERIPHERAL EQUIPMENT" as the second discriminatory indications 10. For example, in the injection molding machine 2, it is possible to use the specific names of the respective sections of the injection molding machine 2 which the operator takes as the operation target such as the hopper 22, the injector 23, and the mold clamper 27 as the second discriminatory indications 10, and in the peripheral equipment 3, it is possible to use the specific names of the peripheral equipment 3 which the operator takes as the operation target such as the drying machine and the temperature control machine as the second discriminatory indications 10.

Further, as described above, in the present embodiment, by the operator inputting the name of the injection molding machine 2 in the molding machine selection field F1 in the control screen W1, the display section 44 displays the progress situations of the operation items 6a, 6b included in the setup operation 6 of the injection molding machine 2 input to the molding machine selection field F1 as the table T1. In other words, when the control device 4 is coupled to the plurality of injection molding machines 2 so as to be able to communicate with each other, it is possible for the operator to change the name of the injection molding machine 2 to be input to the molding machine selection field F1 to thereby display the progress situation of the setup operation 6 in the control screen W1 with respect to each of the injection molding machines 2. Thus, it is possible for the operator to figure out the progress situation of the setup operation 6 of each of the injection molding machines 2. Since it is possible for the operator to determine the priority of the setup operations 6 based on the progress situations, the work efficiency increases.

It should be noted that although the progress situation of the setup operation 6 of one of the injection molding machines 2 is displayed as the table T1 in the control screen W1, it is possible to arrange that the progress situations of the respective setup operations 6 of the plurality of injection molding machines 2 are displayed at the same time in the control screen W1. By the progress situations of the setup operations 6 of the plurality of injection molding machines 2 being displayed in the control screen W1 at the same time, it is possible for the operator to easily figure out the progress situations of the respective setup operations 6 of the plurality of injection molding machines 2.

Then, an inspection screen W2 to be displayed on the display section 44 when the operator selects the inspection button B2 will be described with reference to FIG. 3.

As shown in FIG. 3, by the operator selecting the inspection button B2, the display section 44 displays the inspection screen W2 for displaying the progress situation of an inspection operation of the injection molding machine 2 and the progress situation of an inspection operation of the peripheral equipment 3. The inspection screen W2 includes a table T2 for displaying the progress situation of the inspection operation of the injection molding machine 2 and the progress situation of the inspection operation of the peripheral equipment 3 in a view format, the molding machine selection field F1 for selecting the injection molding machine 2, and the setup button B1, the inspection button B2, and the job information button B3 as the buttons for switching the screen to be displayed by the display section 44. It should be noted that regarding a variety of character strings and numerical values in FIG. 3, character strings and numerical values different from actual ones are displayed in some cases in order to describe the present disclosure easy to understand.

The table T2 for displaying the progress situation of the inspection operation of the injection molding machine 2 and the progress situation of the inspection operation of the peripheral equipment 3 in a view format will be described.

In the present embodiment, in a row located at the head of the table T2, there are displayed the first discriminatory indications 5 for discriminating the first job of the injection molding machine 2 and the second job of the injection molding machine 2 from each other. In a column located at the table side in the table T2, there are displayed names 11 of equipment to be the target of the inspection operation. In the column adjacent to the table side at an opposite side to the table body of the table T2, there are displayed classes 12 of the inspection operations. In the table body of the table T2, in a cell where a row and a column cross each other, there is displayed a progress situation.

The first discriminatory indications 5 displayed in the row located at the head of the table T2 are the same as in the table T1 of the control screen W1 shown in FIG. 2, and the description thereof will be omitted.

The names 11 of the equipment to be the target of the inspection operation displayed in a column located at the table side in the table T2 will be described.

In the present embodiment, in the column located at the table side of the table T2, there are displayed "MOLDING MACHINE" as the injection molding machine 2 and "IMAGE INSPECTION DEVICE" as an example of the peripheral equipment 3 in this order as the names 11 of the equipment to be the target of the inspection operation. Although the image inspection device is displayed as an example of the peripheral equipment 3 in the table T2 in the present embodiment, it is possible to include, for example, a drying machine or a temperature control machine as the peripheral equipment 3 other than the image inspection device in the table T2 as the equipment to be the target of the inspection operation.

The classes 12 of the inspection operations to be displayed in the column adjacent to the table side at an opposite side to the table body of the table T2 will be described.

In the present embodiment, in the column adjacent to the table side at the opposite side to the table body of the table T2, there is displayed "DAILY CHECK" as the class 12 of the inspection operation. It should be noted that "DAILY CHECK" is an example of the class 12 of the inspection operation, and it is possible to include the inspection operations other than DAILY CHECK such as a regular check performed every year in the classes 12 of the inspection operations.

The progress situation of the inspection operation to be displayed in the cell where a row and a column cross each other in the table body of the table T2 will be described.

For example, in the table T2, in a cell 13a where the column corresponding to JOB 1 and the row corresponding to the IMAGE INSPECTION DEVICE cross each other, there is displayed the progress situation of DAILY CHECK of IMAGE INSPECTION DEVICE corresponding to JOB 1. Since DAILY CHECK of IMAGE INSPECTION DEVICE corresponding to JOB 1 is an inspection operation in operation, a progress rate and a scheduled completion time of DAILY CHECK of IMAGE INSPECTION DEVICE corresponding to JOB 1 are displayed in the cell 13a.

In a cell 13b, there is displayed the progress situation of DAILY CHECK of the injection molding machine 2 corresponding to JOB 1. Since DAILY CHECK of the injection molding machine 2 corresponding to JOB 1 is an inspection operation execution of which is complete, there is displayed a check mark as a symbol representing the completion of the execution. In a cell 13c, there is displayed the progress situation of DAILY CHECK of IMAGE INSPECTION DEVICE corresponding to JOB 2. Since DAILY CHECK of IMAGE INSPECTION DEVICE corresponding to JOB 2 is an inspection operation to be performed, there is displayed a hyphen as a symbol representing an operation to be performed.

By the display section 44 displaying the table T2 in the inspection screen W2 in such a manner, it is possible for the operator to figure out the progress situation of the inspection operation of the injection molding machine 2 and the progress situation of the inspection operation of the peripheral equipment 3. Thus, since it is possible for the operator to appropriately cope in accordance with the progress situation of the inspection operation of each of the injection molding machine 2 and the peripheral equipment 3, the work efficiency increases.

It should be noted that although in the present embodiment, the progress situation of the inspection operation of the injection molding machine 2 and the progress situation of the inspection operation of the peripheral equipment 3 are displayed in the table T2, it is possible to arrange that either one of the progress situation of the inspection operation of the injection molding machine 2 and the progress situation of the inspection operation of the peripheral equipment 3 is displayed.

Although the progress situation of the inspection operation of the injection molding machine 2 and the progress situation of the inspection operation of the peripheral equipment 3 are displayed using the numerical values representing the progress rate, and the symbols such as the check mark and the hyphen in the present embodiment, the indications representing the progress situation are not limited thereto. For example, it is possible to display the progress situation in a phased manner using character strings such as "TO BE PREFORMED," "IN OPERATION," and "COMPLETED."

Although the progress rate and the scheduled completion time are displayed as the progress situation of the inspection operation of the injection molding machine 2 and the progress situation of the inspection operation of IMAGE INSPECTION DEVICE as an example of the peripheral equipment 3 in the case of the operation in operation, it is possible to arrange that either one thereof is displayed.

Although the progress rate of the inspection operation of the injection molding machine 2 and the progress rate of the inspection operation of the peripheral equipment are displayed with the numerical value in the present embodiment, it is possible to adopt a graphical indication such as a bar graph or a pie chart.

Further, the progress rates of the inspection operations of the injection molding machine 2 and the peripheral equipment 3 can be calculated in substantially the same manner as the progress rate of the operation item 6a of the injection molding machine 2 and the progress rate of the operation item 6b of the peripheral equipment 3. For example, the progress rate can be calculated by (an elapsed time from the start of the operation of the inspection operation to the present)/(a standard operation time of the inspection operation). The elapsed time from the start of the operation of the inspection operation to the present can be obtained by, for example, the controller 41 of the control device 4 detecting the fact that the operator has started the input related to the inspection operation using the operation section not shown provided to the injection molding machine 2 and the peripheral equipment 3, and the controller 41 measuring the time from the time point when the operator has started the input related to the inspection operation to the present.

Then, a job information screen W3 to be displayed on the display section 44 when the operator selects the job information button B3 will be described with reference to FIG. 4.

As shown in FIG. 4, by the operator selecting the job information button B3, the display section 44 displays the job information screen W3 for displaying information of the job of the injection molding machine 2. The job information screen W3 includes a table T3 for displaying the information of the jobs of the injection molding machine 2 in a view format, the molding machine selection field F1 for selecting the injection molding machine 2, and the setup button B1, the inspection button B2, and the job information button B3 as the buttons for switching the screen to be displayed by the display section 44. It should be noted that regarding a variety of character strings and numerical values in FIG. 4, character strings and numerical values different from actual ones are displayed in some cases in order to describe the present disclosure easy to understand.

The table T3 for displaying the information of the jobs of the injection molding machine 2 in a view format will be described.

In the present embodiment, in a row located at the head of the table T3, there are displayed the first discriminatory indications 5 for discriminating the first job of the injection molding machine 2 and the second job of the injection molding machine 2 from each other. In a column located at the table side in the table T3, there are displayed information divisions 15 of the jobs. In the table body of the table T3, in a cell where a row and a column cross each other, there is displayed the information of the job corresponding to the information division 15 of the job.

The first discriminatory indications 5 displayed in the row located at the head of the table T3 are the same as in the table T1 of the control screen W1 shown in FIG. 2, and the description thereof will be omitted.

The information divisions 15 of the jobs displayed in the column located at the table side in the table T3 will be described.

In the present embodiment, "MOLDED ITEM," "PLANNED VOLUME," "ITEM OF MATERIAL 1," "NECESSARY QUANTITY OF MATERIAL 1," "ITEM OF MATERIAL 2," and "NECESSARY QUANTITY OF MATERIAL 2" are arranged in this order in the column located at the table side of the table T3 as the information divisions 15 of the jobs.

In the column located at the table side in the table T3, MOLDED ITEM is an item related to the molded item of the molded article production of which is planned in each of the jobs, and is, for example, a name or a part number of the molded article. PLANNED VOLUME is an item related to the planned volume of the molded article production of which is planned in each of the jobs. ITEM OF MATERIAL 1 and ITEM OF MATERIAL 2 are items related to the material to be used for the production of the molded article production of which is planned in each of the jobs, and are each, for example, a name or a part number of the material. NECESSARY QUANTITY OF MATERIAL 1 and NECESSARY QUANTITY OF MATERIAL 2 are items related to a necessary quantity of the material necessary for the production of the molded article production of which is planned in each of the jobs. Although it is arranged in the present embodiment that two types of materials, namely MATERIAL 1, MATERIAL 2, are displayed in the table T3 as the materials necessary for the production of the molded article production of which is planned, it is possible to arrange that just one type of material or three or more types of materials are displayed in the table T3. Further, MOLDED ITEM, PLANNED VOLUME, ITEM OF MATERIAL 1, NECESSARY QUANTITY OF MATERIAL 1, ITEM OF MATERIAL 2, and NECESSARY QUANTITY OF MATERIAL 2 are an example of the information divisions 15 of the jobs, and it is possible to arrange that, for example, a scheduled production start time and a scheduled production end time are displayed as the information divisions 15 of the jobs in the table T3.

The information of the jobs to be displayed in the cell where a row and a column cross each other in the table body of the table T3 will be described.

For example, in the table T3, in a cell 16a where the column corresponding to JOB 1 and the row corresponding to MOLDED ITEM cross each other, there is displayed "COMPONENT A" as MOLDED ITEM corresponding to JOB 1, and in a cell 16b where the column corresponding to JOB 1 and the row corresponding to PLANNED VOLUME cross each other, there is displayed "5000" as PLANNED VOLUME corresponding to JOB 1, and it is understood that JOB 1 is a job for producing COMPONENT A as much as 5000 pieces.

Further, for example, in the table T3, in a cell 16c where the column corresponding to JOB 2 and the row corresponding to ITEM OF MATERIAL 1 cross each other, there is displayed "MATERIAL C" as MATERIAL 1 of the molded article corresponding to JOB 2, and in a cell 16d where the column corresponding to JOB 2 and the row corresponding to ITEM OF MATERIAL 2 cross each other, there is displayed "MATERIAL D" as MATERIAL 2 of the molded article corresponding to JOB 2, and it is understood that JOB 2 uses MATERIAL C and MATERIAL D as the materials of the molded article produced in JOB 2.

By the display section 44 displaying the table T3 in the job information screen W3 in such a manner, it is possible for the operator to figure out the information of the jobs of the injection molding machine 2. Thus, since it is possible for the operator to appropriately cope in accordance with the information of the jobs of the injection molding machine 2, the work efficiency increases.

It should be noted that although in the present embodiment, by the operator selecting the setup button B1, the inspection button B2, and the job information button B3, the display section 44 switches between the control screen W1 including the table T1, the inspection screen W2 including the table T2, and the job information screen W3 including the table T3 to display, but it is possible to arrange that the display section 44 displays the table T1 and the table T2, or the table T1 and the table T3 in the same screen.

As described hereinabove, according to the present embodiment, the following advantages can be obtained.

The molding machine control system 1 according to the present embodiment is provided with the display section which displays the operation items 6a of the injection molding machine 2 included in the setup operation 6 of the injection molding machine 2, and the operation items 6b of the peripheral equipment 3 included in the setup operation 6 of the injection molding machine 2, and the display section 44 displays the first discriminatory indications 5 for discriminating JOB 1 as the first job of the injection molding machine 2 and JOB 2 as the second job of the injection molding machine 2 from each other, and is capable of displaying the progress situation of the operation item 6a of the injection molding machine 2 corresponding to JOB 1, the progress situation of the operation item 6b of the peripheral equipment corresponding to JOB 1, the progress situation of the operation item 6a of the injection molding machine 2 corresponding to JOB 2, and the progress situation of the operation item 6b of the peripheral equipment 3 corresponding to JOB 2 as the table T1 in a view format.

Thus, it is possible to provide the molding machine control system 1 capable of making the operator know the progress situation of the operation item 6b of the peripheral equipment 3 together with the progress situation of the operation item 6a of the injection molding machine 2. Further, it is possible to provide the molding machine control system 1 capable of making the operator know the setup operation 6 of JOB 2 as the second job together with the setup operation 6 of JOB 1 as the first job. Since it is possible for the operator to appropriately cope in accordance with the setup state of the peripheral equipment 3 and the progress situation of the setup operation 6 of the subsequent job in the setup operation 6 of the injection molding machine 2 with this molding machine control system 1, the work efficiency increases.

2. Embodiment 2

Then, a control screen W1a displayed by the display section 44 of the molding machine control system 1 according to Embodiment 2 will be described with reference to FIG. 5. It should be noted that constituents substantially the same as in Embodiment 1 are denoted by the same reference symbols, and the description thereof will be omitted. The control screen W1a related to Embodiment 2 includes a table T1a. Embodiment 2 is substantially the same as Embodiment 1 except the point that second discriminatory indications 10a for discriminating the operation items 6a of the injection molding machine 2 and the operation items 6b of the peripheral equipment 3 from each other are different in the table T1a from Embodiment 1. In Embodiment 2, the display section 44 displays the operation items 6a of the injection molding machine 2 and the operation items 6b of the peripheral equipment 3 in respective display configurations different from each other as the second discriminatory indications 10a.

As shown in FIG. 5, in Embodiment 2, there is no column adjacent at the table side at the opposite side to the table body in the table T1a, and the second discriminatory indications 10a for discriminating the operation items 6a of the injection molding machine 2 and the operation items 6b of the peripheral equipment 3 from each other are realized by providing a different display configuration to a part of the table T1a.

In the present embodiment, the display section 44 displays the operation items 6a of the injection molding machine 2 included in the setup operation 6 of the injection molding machine 2 and the operation items 6b of the peripheral equipment 3 included in the setup operation 6 of the injection molding machine 2 in the column located at the table side in the table T1a, and at the same time, displays a background of a cell with a white color without hatching as the second discriminatory indication 10a in the cells corresponding to the operation items 6a of the injection molding machine 2, and displays a background of a cell with light hatching as the second discriminatory indication 10a in the cells corresponding to the operation items 6b of the peripheral equipment 3.

For example, in the column located at the table side in the table T1a, the background of each of a cell 60a for displaying DRYING MATERIAL, a cell 60b for displaying ATTACHING TEMPERATURE CONTROL MACHINE, and a cell 60c for displaying RETRIEVING MOLDING CONDITIONS as the operation items 6b of the peripheral equipment 3 is displayed with the light hatching. In contrast, in the column located at the table side in the table T1a, the background of each of the cells other than the cells 60a, 60b, and 60c such as a cell 60d for displaying LOWERING TEMPERATURE OF MANIFOLD, and a cell 60e for displaying WASTE SHOT as the operation items 6a of the injection molding machine 2 is displayed with the white color without the hatching.

In other words, in the column located at the table side in the table T1a, the cells corresponding to the operation items 6a of the injection molding machine 2 and the cells corresponding to the operation items 6b of the peripheral equipment 3 are displayed with the respective hatching as the display configurations different from each other in accordance with whether the operation items 6a, 6b displayed in the respective cells are the operation items 6a of the injection molding machine 2 or the operation items 6b of the peripheral equipment 3.

It should be noted that the display configurations different from each other are not limited to the variation of the hatching in the cells, and it is possible to use any variations in display configuration such as a variation in background color of the cells, a variation in frame border, a variation in font or color of characters and numbers displayed in the cells, or addition of a symbol such as an icon. Further, although in the present embodiment, the display configuration of the cells in the column located at the table side in the table T1a is varied as the second discriminatory indications 10a, it is possible to vary, for example, the display configuration of the row including the cell in the column located at the table side in the table T1a besides the cell in the column located at the table side in the table T1a.

According to the present embodiment, the following advantages can be obtained in addition to the advantages in Embodiment 1.

By the display section 44 displaying the operation items 6a of the injection molding machine 2 and the operation items 6b of the peripheral equipment 3 with the respective display configurations different from each other as the second discriminatory indications 10a for discriminating the operation items 6a of the injection molding machine 2 and the operation items 6b of the peripheral equipment 3, it is possible for the operator to visually discriminate each of the operation items 6a, 6b between the operation item 6a of the injection molding machine 2 and the operation item 6b of the peripheral equipment 3 with ease and certainty, and thus, the work efficiency increases.

3. Embodiment 3

Then, a control screen W1b displayed by the display section 44 of the molding machine control system 1 according to Embodiment 3 will be described with reference to FIG. 6. It should be noted that constituents substantially the same as in Embodiment 1 are denoted by the same reference symbols, and the description thereof will be omitted. The control screen W1b related to Embodiment 3 includes a table T1b. Embodiment 3 is substantially the same as Embodiment 1 except the point that the progress situations of the operation items 6a, 6b are displayed with respective display configurations different from each other in accordance with the progress situations of the operation items 6a, 6b in the table T1b.

As shown in FIG. 6, in Embodiment 3, the display configuration of the cell where a row and a column cross each other in the table body of the table T1b is different by the progress situation to be displayed in the cell.

For example, in a cell 7j where the column of JOB 1 and the row of DRYING MATERIAL cross each other, there is displayed the progress situation of DRYING MATERIAL corresponding to JOB 1. Since DRYING MATERIAL corresponding to JOB 1 is an operation in operation, the progress rate of DRYING MATERIAL corresponding to JOB 1, and the scheduled completion time of DRYING MATERIAL corresponding to JOB 1 are displayed in the cell 7j, and at the same time, the background of the cell 7j is displayed with the light hatching.

Similarly, regarding a cell 7k for displaying the progress situation of ATTACHING TEMPERATURE CONTROL MACHINE corresponding to JOB 1 and a cell 7m in which the progress situation of LOWERING TEMPERATURE OF MANIFOLD corresponding to JOB 1 is displayed, since the operations corresponding to the respective cells 7k, 7m are operations in operation, the progress rates and the scheduled completion times of the respective operations are displayed in the cell 7k and the cell 7m, and at the same time, the background of each of the cell 7k and the cell 7m is displayed with the light hatching.

Since the execution of RAISING TEMPERATURE OF HOPPER corresponding to JOB 1 is completed, a white check mark as a symbol representing completion of the execution is displayed in a cell 7n in which the progress situation of RAISING TEMPERATURE OF HOPPER corresponding to JOB 1 is displayed, and at the same time, the background of the cell 7n is displayed with dark hatching.

Regarding the cell 7e in which the progress situation of WASTE SHOT corresponding to JOB 1 is displayed, the cell 7f in which the progress situation of ATTACHING TEMPERATURE CONTROL MACHINE corresponding to JOB 2 is displayed, and the cell 7g in which the progress situation of PURGE ON RESIN CHANGE corresponding to JOB 2 is displayed, since the operations corresponding respectively to the cells 7e, 7f, and 7g are operations to be performed, a hyphen as a symbol representing an operation to be performed is displayed in the cell 7e, the cell 7f, and the cell 7g, and at the same time, the background of each of the cells is displayed with a white color without hatching.

The cells 7k, 7j, 7m, 7n, 7e, 7f, and 7g are examples of the cell where a row and a column cross each other in the table body of the table T1b, and in the present embodiment, the cell where a column and a row cross each other in the table body of the table T1b is displayed with the hatching different by the progress situation to be displayed in the cell as the display configuration different by the progress situation to be displayed in the cell similarly to the cells 7k, 7j, 7m, 7n, 7e, 7f, and 7g.

It should be noted that the display configurations different from each other are not limited to the variation of the hatching in the cells, and it is possible to use any variations in display configuration such as a variation in background color of the cells, a variation in frame border, a variation in font or color of characters and numbers displayed in the cells, or addition of a symbol such as an icon.

According to the present embodiment, the following advantages can be obtained in addition to the advantages in Embodiment 1.

By the display section 44 displaying the progress situation of the operation item 6a of the injection molding machine 2 and the progress situation of the operation item 6b of the peripheral equipment 3 with respective display configurations different from each other in accordance with the progress situation of the operation item 6a of the injection molding machine 2 and the progress situation of the operation item 6b of the peripheral equipment 3, it is possible for the operator to visually discriminate between the progress situations of the operation items 6a, 6b with ease and certainty, and thus, the work efficiency increases.

4. Embodiment 4

Then, a control screen W1c displayed by the display section 44 of the molding machine control system 1 according to Embodiment 4 will be described with reference to FIG. 7. It should be noted that constituents substantially the same as in Embodiment 1 are denoted by the same reference symbols, and the description thereof will be omitted. The control screen W1c related to Embodiment 4 includes a table T1c. Embodiment 4 is substantially the same as Embodiment 1 except the point that third discriminatory indications 70 for discriminating manual operations and machine operations from each other are displayed with respect to the operation items 6a, 6b in the table T1c.

It should be noted that the "manual operation" in the present disclosure means an operation high in workload of the operator. The workload of the operator is also called a human load, and the manual operation is also called a human operation. Further, the "machine operation" in the present disclosure means an operation low in workload of the operator. Further, the workload of the operator in the present disclosure is a concept including a time in which the operator is bound to perform the operation.

For example, in the present embodiment, ATTACHING TEMPERATURE CONTROL MACHINE out of the operation items 6b of the peripheral equipment 3 is an operation of the operator moving the temperature control machine in the vicinity of the injection molding machine 2 to be installed, and is therefore the operation high in workload of the operator, and corresponds to the manual operation. Out of the operation items 6a of the injection molding machine 2, PURGE BEFORE PRODUCTION is an operation which is performed by the operator while the operator watches the discharge situation of the material to be discharged from the injector 23 of the injection molding machine 2, and therefore corresponds to the manual operation.

Further, out of the operation items 6b of the peripheral equipment 3, DRYING MATERIAL includes an operation of the operator carrying the material of the molded article in the drying machine or carrying the material out from the drying machine, and an operation of the operator inputting predetermined information to the drying machine, but corresponds to the machine operation since it takes more than several hours for the drying machine to dry the material, and the operator is not bound to DRYING MATERIAL during the period in which the drying machine is drying the material.

It should be noted that it is possible for the third discriminatory indications 70 to be displayed in accordance with a classification between the manual operation and the machine operation set in advance by an administrator for each of the operation items 6a, 6b.

Figure 7:
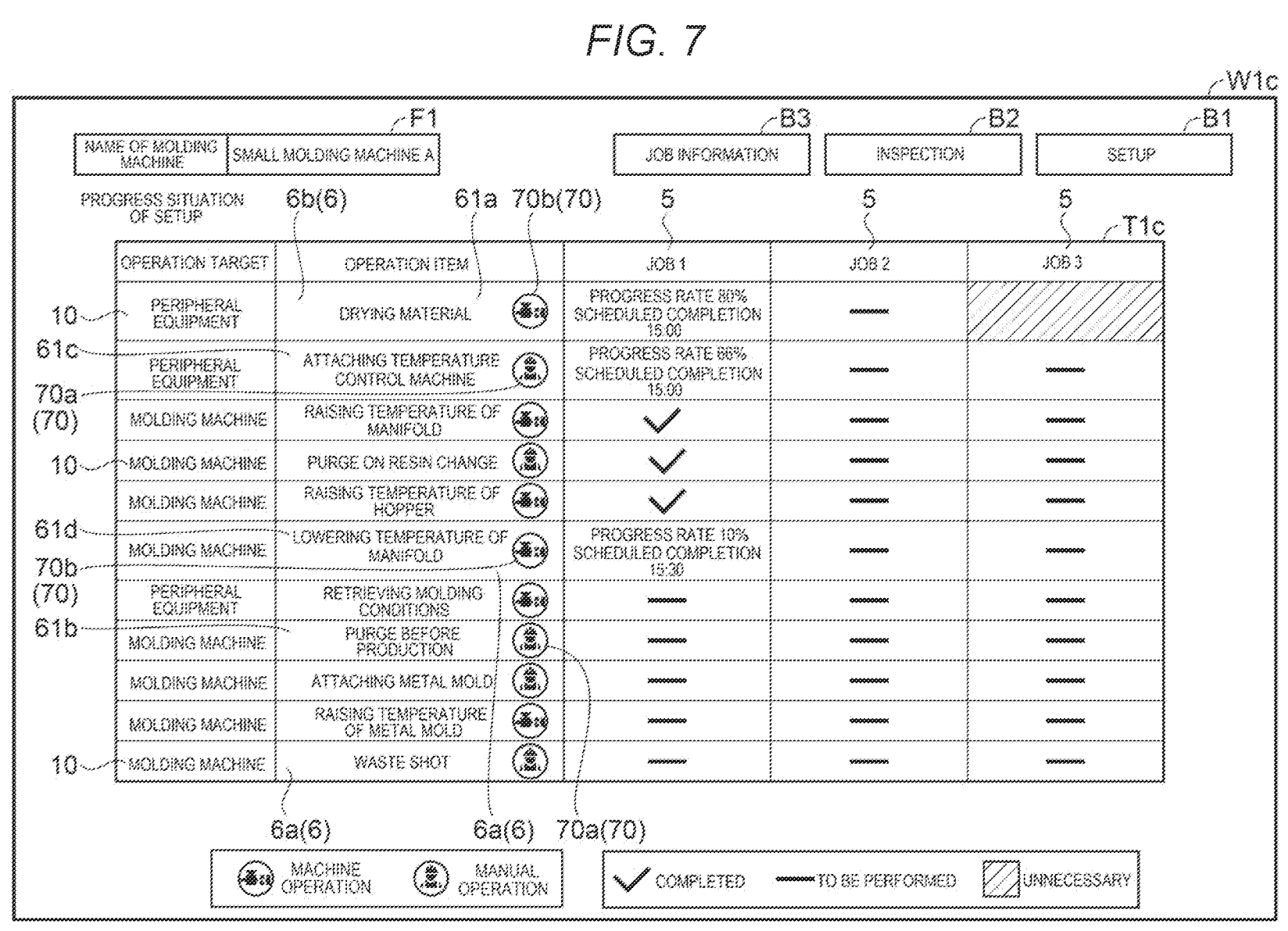

As shown in FIG. 7, in Embodiment 4, in the column located at the table side in the table T1c, the operation items 6a of the injection molding machine 2 included in the setup operation 6 of the injection molding machine 2 and the operation items 6b of the peripheral equipment 3 included in the setup operation 6 of the injection molding machine 2 are displayed, and at the same time, the third discriminatory indications 70 for discriminating the manual operations and the machine operations from each other are displayed with respect to the operation items 6a, 6b. In the present embodiment, the third discriminatory indications 70 for discriminating the manual operations and the machine operations from each other include an icon 70a representing the manual operation, and an icon 70b representing the machine operation.

For example, in the column located at the table side in the table T1c, in a cell 61a for displaying DRYING MATERIAL as the operation item 6b of the peripheral equipment 3, there is displayed the icon 70b representing the machine operation as the third discriminatory indication 70 for discriminating the manual operation and the machine operation from each other. Similarly, in a cell 61b for displaying PURGE BEFORE PRODUCTION as the operation item 6a of the injection molding machine 2, there is displayed the icon 70a representing the manual operation as the third discriminatory indication 70.

In contrast, in the column located at the table side in the table T1c, in a cell 61c for displaying ATTACHING TEMPERATURE CONTROL MACHINE as the operation item 6b of the peripheral equipment 3, there is displayed the icon 70a representing the manual operation as the third discriminatory indication 70 for discriminating the manual operation and the machine operation from each other. Similarly, in a cell 61d for displaying LOWERING TEMPERATURE OF MANIFOLD as the operation item 6a of the injection molding machine 2, there is displayed the icon 70b representing the machine operation as the third discriminatory indication 70.

As described above, by the third discriminatory indications 70 for discriminating the manual operations and the machine operations from each other being displayed, it is possible for the operator to figure out whether the operation item 6a, 6b is the manual operation or the machine operation.

It should be noted that although in the present embodiment, the third discriminatory indications 70 for discriminating the manual operation and the machine operation from each other are the icon 70a representing the manual operation and the icon 70b representing the machine operation, the third discriminatory indications 70 are not limited to the icons 70a, 70b, and it is possible to use any variations in display configuration such as a variation in background color, hatching, or a variation in frame border of the cells in the column located at the table side in the table T1c, or a variation in color of characters and numbers, or font displayed in the cells.

Further, in the present embodiment, the third discriminatory indications 70 for discriminating the manual operations and the machine operations from each other are the icon 70a representing the manual operation, and the icon 70b representing the machine operation, but it is possible to arrange that either one of the icon 70a and the icon 70b is used. When using either one of the icon 70a and the icon 70b, for example, the operation items 6a, 6b in which the icon 70a representing the manual operation is displayed represent the manual operation, and the operation items 6a, 6b in which the icon 70a representing the manual operation is not displayed represent the machine operation as a result.

Further, in the present embodiment, the third discriminatory indications 70 for discriminating the manual operation and the machine operation from each other are displayed in the column located at the table side in the table T1c, but it is possible to arrange that it is displayed in a cell where a row and a column cross each other in the table body of the table T1c. For example, when executing the job of producing the same molded item a plurality of times in a row, the operation item which becomes the manual operation in the setup operation 6 corresponding to the first job can turn to the machine operation in the setup operation 6 corresponding to the second and the subsequent jobs. By displaying the third discriminatory indications 70 for discriminating the manual operations and the machine operations from each other in the table body of the table T1c, it is possible to appropriately display the third discriminatory indications 70 in accordance with a production plan of the molded article and so on.

According to the present embodiment, the following advantages can be obtained in addition to the advantages in Embodiment 1.

The display section 44 displays the third discriminatory indications 70 for discriminating the manual operations and the machine operations from each other with respect to the operation items 6a of the injection molding machine 2 and the operation items 6b of the peripheral equipment 3. Thus, it is possible for the operator to figured out whether the operation item 6a, 6b is the manual operation or the machine operation, and therefore, the work efficiency increases.

5. Embodiment 5

Then, a control screen W1d and an input screen W4 to be displayed by the display section 44 of the molding machine control system 1 according to Embodiment 5 will be described with reference to FIG. 8 and FIG. 9. It should be noted that constituents substantially the same as in Embodiment 4 are denoted by the same reference symbols, and the description thereof will be omitted. The display section 44 related to Embodiment 5 is substantially the same as that of Embodiment 4 except the point that the display section 44 displays the table T1d including a reception section 8 for receiving a selection of specific operation items 6a, 6b by the operator in the control screen W1d, and when the selection of the specific operation items 6a, 6b is received in the reception section 8, the display section 44 displays the input screen W4 including an input section 9 for the operator to input the progress situation of the specific operation items 6a, 6b.

Figure 8:
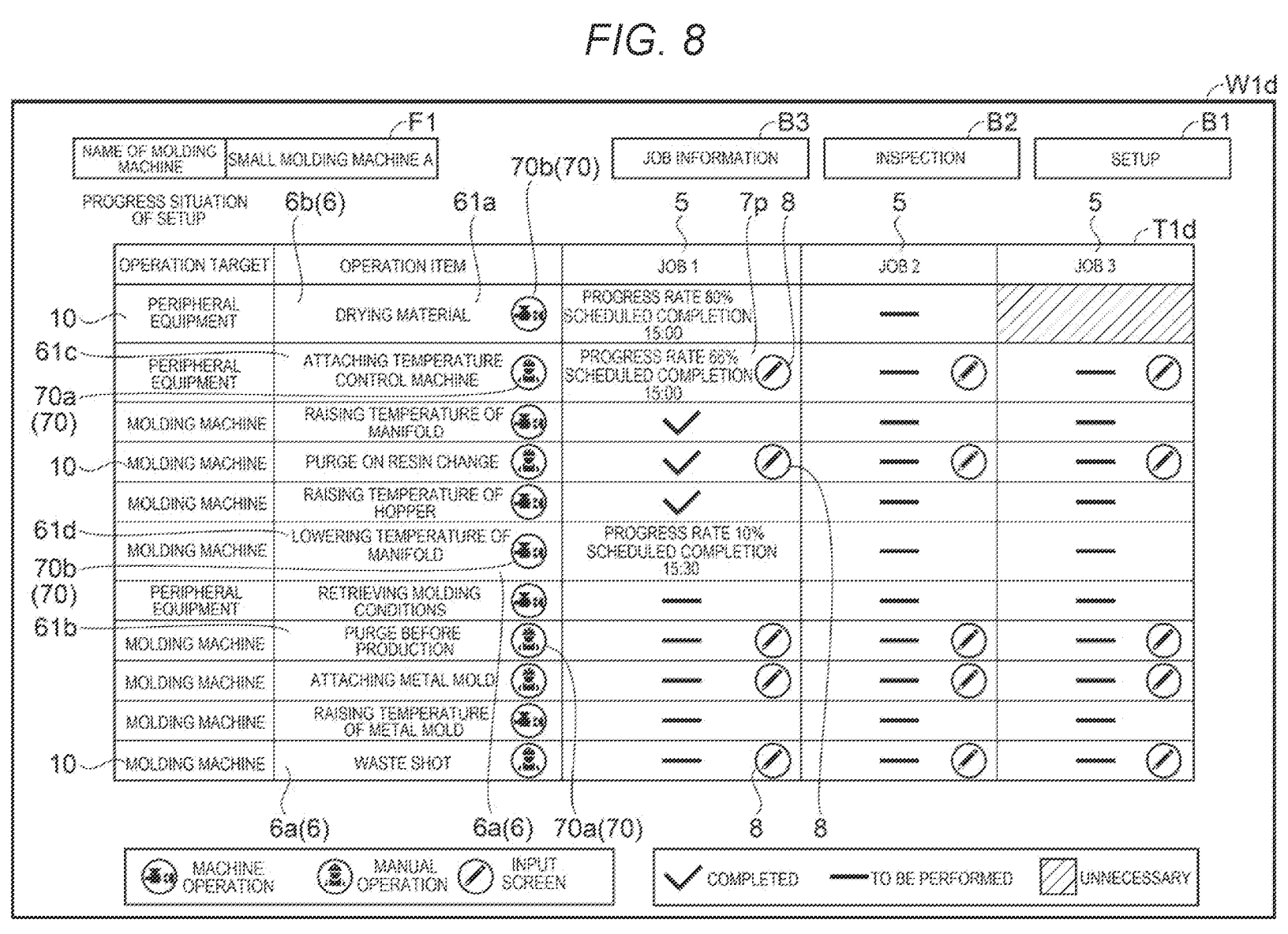

As shown in FIG. 8, the reception section 8 for receiving the selection of the operator is displayed in the cells corresponding to the operation items 6a, 6b discriminated as the manual operations out of the cells where a row and a column cross each other in the table body of the table T1d. In the present embodiment, an icon is displayed as the reception section 8. In the table body of the table T1d, a cell 7p is an example of the cell corresponding to the operation item 6a, 6b discriminated as the manual operation. The reception section 8 is displayed in the cell 7p.

For example, it is possible for the operator to select the operation corresponding to the cell 7p as the specific operation item 6a, 6b by operating an operation section 43 of the control device 4 to overlap a cursor not shown with the reception section 8 displayed in the cell 7p. The cell 7p is a cell for displaying the progress situation of ATTACHING TEMPERATURE CONTROL MACHINE corresponding to JOB 1. In other words, it is possible for the operator to select ATTACHING TEMPERATURE CONTROL MACHINE corresponding to JOB 1 as the specific operation items 6a, 6b by overlapping the cursor not shown with the reception section 8 displayed in the cell 7p. In other words, the reception section 8 displayed in the cell 7p receives the selection of ATTACHING TEMPERATURE CONTROL MACHINE corresponding to JOB 1 as the specific operation items 6a, 6b.

As shown in FIG. 9, when the selection of the specific operation item 6a, 6b has been received in the reception section 8, the display section 44 displays the input screen W4 including the input section 9 for the operator to input the progress situation of the specific operation item 6a, 6b having been received by the reception section 8.

The input screen W4 includes the input section 9 for inputting the progress situation of the specific operation item 6a, 6b having been received by the reception section 8, a molding machine name display field F2 for displaying the injection molding machine 2 corresponding to the specific operation item 6a, 6b, a job display field F3 for displaying the job corresponding to the specific operation item 6a, 6b, an operation item display field F4 for displaying the specific operation item 6a, 6b, a decision button B4, and a cancel button B5.

The input section 9 is a field for the operator to input the progress situation of the specific operation item 6a, 6b received by the reception section 8. In the present embodiment, the input section 9 is configured as a pull-down menu which allows the operator to input the progress rate as the progress situation of the specific operation item 6a, 6b.

For example, when the reception section 8 displayed in the cell 7p receives the selection of ATTACHING TEMPERATURE CONTROL MACHINE corresponding to JOB 1 as the specific operation item 6a, 6b in the table T1d of the control screen W1d, the display section 44 displays the input screen W4 for inputting the progress situation of ATTACHING TEMPERATURE CONTROL MACHINE corresponding to JOB 1. On this occasion, in the input screen W4, the name of the molding machine, the job, and the operation item 6a, 6b corresponding to the cell 7p in the table T1d of the control screen W1d are respectively displayed in the molding machine name display field F2, the job display field F3, and the operation item display field F4. The operator operates the cursor not shown to input the progress rate as the progress situation of ATTACHING TEMPERATURE CONTROL MACHINE corresponding to JOB 1 in the input section 9 displayed in the input screen W4.

When the operator operates the cursor not shown to press the decision button B4 after inputting the progress situation of ATTACHING TEMPERATURE CONTROL MACHINE corresponding to JOB 1 to the input section 9, the display section 44 receives the progress situation of ATTACHING TEMPERATURE CONTROL MACHINE corresponding to JOB 1 input to the input section 9, and at the same time, displays the control screen W1d in which the progress situation of ATTACHING TEMPERATURE CONTROL MACHINE corresponding to JOB 1 has been updated. In contrast, when the operator has pressed the cancel button B5, the display section 44 displays the control screen W1d without receiving the input of the progress situation of ATTACHING TEMPERATURE CONTROL MACHINE corresponding to JOB 1.

According to the present embodiment, the following advantages can be obtained in addition to the advantages in Embodiment 4.

By displaying the reception section 8 for receiving the selection of the specific operation item 6a, 6b out of the operation items 6a of the injection molding machine 2 and the operation items 6b of the peripheral equipment 3 discriminated as the manual operations, and then displaying the input section 9 for inputting the progress situation of the specific operation item 6a, 6b when the selection of the specific operation item 6a, 6b is received in the reception section 8, it is possible for the operator to specifically input the progress situation of the operation items 6a of the injection molding machine 2 and the operation items 6b of the peripheral equipment 3 discriminated as the manual operations. In other words, since it is possible for the operator to specifically figure out the current progress situation instead of, for example, the progress rate calculated by (the elapsed time from the start of the operation of the operation item 6a, 6b to the present)/(the standard operation time of the operation item 6a, 6b), the work efficiency increases.

It should be noted that although the reception section 8 for receiving the selection by the operator is displayed as an icon in the present embodiment, it is possible for the reception section 8 to take a display configuration other than the icon. For example, it is possible to make the background part of the cell displayed in the table body of the table T1d function as the reception section 8.

6. Embodiment 6

Then, an input screen W4a displayed by the display section 44 of the molding machine control system 1 according to Embodiment 6 will be described with reference to FIG. 10. It should be noted that constituents substantially the same as in Embodiment 5 are denoted by the same reference symbols, and the description thereof will be omitted. The display section 44 related to Embodiment 6 is substantially the same as that of Embodiment 5 except the point that an input section 9*a* for the operator to input the progress situation of the specific operation item 6*a*, 6*b* is different in the input screen W4*a*.

Figure 10:
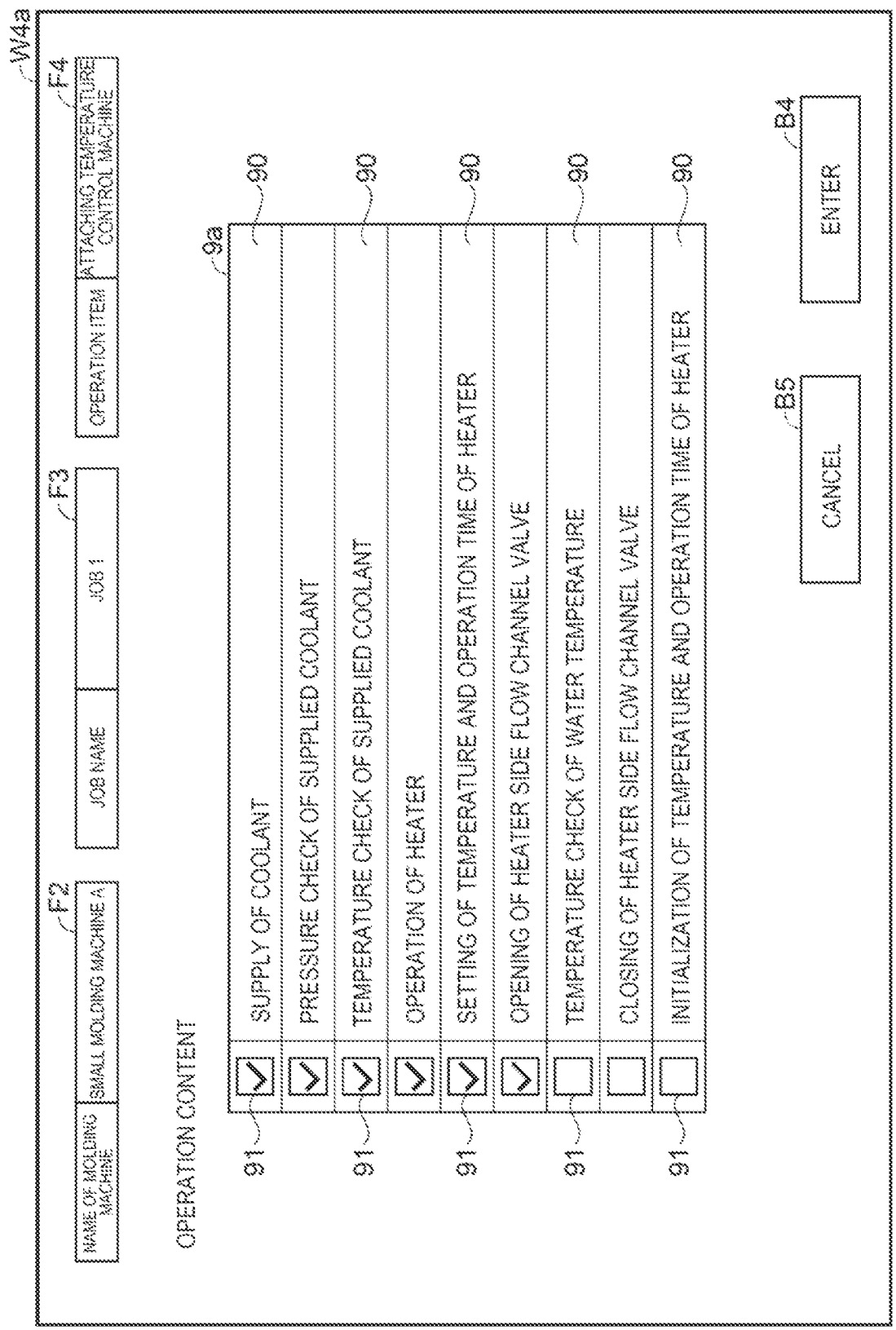
FIG. 10 is an explanatory diagram showing an example of an input screen displayed by a display section related to Embodiment 6.

As shown in FIG. 10, the input screen W4*a* includes the input section 9*a* for inputting the progress situation of the specific operation item 6*a*, 6*b* received by the reception section 8, the molding machine name display field F2 for displaying the injection molding machine 2, the job display field F3, the operation item display field F4, the decision button B4, and the cancel button B5.

In the present embodiment, the input section 9*a* is a table in a view format including elemental operations 90 included in the specific operation item 6*a*, 6*b* received by the reception section 8, and check boxes 91 representing execution situations of the respective elemental operations 90. The elemental operations 90 included in the specific operation item 6*a*, 6*b* are arranged in one column. The check boxes 91 representing the respective execution situations of the elemental operations 90 are arranged in a column adjacent to the column in which the elemental operations 90 are displayed so as to correspond to the respective elemental operations 90.

When the operator executes the elemental operation 90 included in the specific operation item 6*a*, 6*b*, the operator operates the cursor not shown to thereby perform input to the check box 91 corresponding to the elemental operation 90 thus executed. By the operator performing the input to the check box 91, a check mark is displayed in the check box 91 corresponding to the elemental operation 90 thus executed. In other words, the number of the check marks in the check boxes 91 represents the progress situation of the specific operation item 6*a*, 6*b* selected by the operator. For example, the progress rate as the progress situation of the specific operation item 6*a*, 6*b* can be calculated by (the number of check boxes 91 in which the check mark is displayed)/(the number of all of the check boxes).

In the present embodiment, as an example of the input screen W4*a*, there is described the input screen W4*a* when the specific operation item 6*a*, 6*b* received by the reception section 8 is ATTACHING TEMPERATURE CONTROL MACHINE corresponding to JOB 1.

In the input screen W4*a*, there is displayed the input section 9*a* for inputting the progress situation of ATTACHING TEMPERATURE CONTROL MACHINE corresponding to JOB 1. Then, "SUPPLY OF COOLANT," "PRESSURE CHECK OF SUPPLIED COOLANT," "TEMPERATURE CHECK OF SUPPLIED COOLANT," and so on are displayed as the elemental operations 90 included in ATTACHING TEMPERATURE CONTROL MACHINE, and the check boxes 91 corresponding to the respective elemental operations 90 are displayed at positions adjacent to the respective elemental operations 90.

In each of the check boxes 91 corresponding respectively to the elemental operations 90 having been executed by the operator such as SUPPLY OF COOLANT and PRESSURE CHECK OF SUPPLIED COOLANT out of the elemental operations 90, the input by the operator is performed, and thus, the check mark is displayed. In the check boxes 91 corresponding to the elemental operations 90 to be performed such as TEMPERATURE CHECK OF SUPPLIED COOLANT out of the elemental operations 90, the input by the operator is not performed, and the check mark is not displayed.

When the operator operates the cursor not shown to press the decision button B4, the display section 44 receives the progress situation of ATTACHING TEMPERATURE CONTROL MACHINE corresponding to JOB 1 input to the input section 9*a*, and at the same time, displays the control screen W1*d* in which the progress situation of ATTACHING TEMPERATURE CONTROL MACHINE corresponding to JOB 1 has been updated. In contrast, when the operator has pressed the cancel button B5, the display section 44 displays the control screen W1*d* without receiving the progress situation of ATTACHING TEMPERATURE CONTROL MACHINE corresponding to JOB 1 input to the input section 9*a*.

According to the present embodiment, the following advantages can be obtained in addition to the advantages in Embodiment 5.

Since the input section 9*a* is a table in a view format including the elemental operations 90 included in the specific operation item 6*a*, 6*b* selected by the operator, and the check boxes 91 representing the execution situation of the respective elemental operations 90, it is possible for the operator to surely perform the elemental operations 90 included in the specific operation item 6*a*, 6*b*, and thus, the work efficiency increases.

7. Embodiment 7

Then, a control screen W1*e* displayed by the display section 44 of the molding machine control system 1 according to Embodiment 7 will be described with reference to FIG. 11. It should be noted that constituents substantially the same as in Embodiment 1 are denoted by the same reference symbols, and the description thereof will be omitted. The control screen W1*e* related to Embodiment 7 includes a table T1*e*. Embodiment 7 is substantially the same as Embodiment 1 except the point that fourth discriminatory indications 74 for discriminating a process class with respect to the operation items 6*a* of the injection molding machine 2 and the operation items 6*b* of the peripheral equipment 3 are displayed in the table T1*e*.

The process class includes external setup and internal setup. The "external setup" in the present disclosure means the operation item 6*a*, 6*b* which can be executed without stopping the injection molding machine 2 out of the operation items 6*a*, 6*b* included in the setup operation 6 of the injection molding machine 2, and the "internal setup" means the operation item 6*a*, 6*b* which cannot be executed unless stopping the injection molding machine 2 out of the operation items 6*a*, 6*b* included in the setup operation 6 of the injection molding machine 2.

For example, in the present embodiment, DRYING MATERIAL out of the operation items 6*b* of the peripheral equipment 3 is an operation to be performed independently of the injection molding machine 2 using the drying machine used for drying the material, and is an operation which can be executed in parallel to the operation items 6*a* of the injection molding machine 2 without stopping the injection molding machine 2. Therefore, DRYING MATERIAL corresponds to the external setup. ATTACHING TEMPERATURE CONTROL MACHINE out of the operation items 6*b* of the peripheral equipment 3 is an operation which cannot be executed unless stopping the injection molding machine 2, and corresponds to the internal setup. Further, LOWERING TEMPERATURE OF MANIFOLD, WASTE SHOT, and so on out of the operation items 6*a* of the injection molding machine 2 are the operations which cannot be executed unless stopping the injection molding machine 2, and correspond to the internal setup.

As shown in FIG. 11, in Embodiment 7, the operation items 6a of the injection molding machine 2 included in the setup operation 6 of the injection molding machine 2 and the operation items 6b of the peripheral equipment 3 included in the setup operation 6 of the injection molding machine 2 are displayed in the column located at the table side of the table T1e, the second discriminatory indications 10 for discriminating the operation items 6a of the injection molding machine 2 and the operation items 6b of the peripheral equipment 3 from each other are displayed in the column adjacent at the table side at the opposite side to the table body of the table T1e, and further, the fourth discriminatory indications 74 for discriminating the process class are displayed in the column at the opposite side to the table side out of the columns adjacent to the column in which the second discriminatory indications 10 are displayed.

The fourth discriminatory indications 74 are disposed for clearly showing whether each of the operation items 6a of the injection molding machine 2 and the operation items 6b of the peripheral equipment 3 displayed at the table side of the table T1e is the external setup or the internal setup to the operator. Specifically, the display section 44 displays the two classes, namely the external setup and the internal setup, as the fourth discriminatory indications 74.

According to the present embodiment, the following advantages can be obtained in addition to the advantages in Embodiment 1. The display section 44 displays the fourth discriminatory indications 74 for discriminating the process class including the external setup and the internal setup from each other with respect to the operation items 6a of the injection molding machine 2 and the operation items 6b of the peripheral equipment 3. Thus, it is possible for the operator to figured out whether the operation item 6a, 6b is the external setup or the internal setup, and therefore, the work efficiency increases.

8. Embodiment 8

Then, a control screen W1f displayed by the display section 44 of the molding machine control system 1 according to Embodiment 8 will be described with reference to FIG. 12. It should be noted that constituents substantially the same as in Embodiment 7 are denoted by the same reference symbols, and the description thereof will be omitted. The control screen W1f related to Embodiment 8 includes a table T1f. Embodiment 8 is substantially the same as Embodiment 7 except the point that fourth discriminatory indications 74a for discriminating the process class are different in the table T1f. In Embodiment 8, the display section 44 displays the operation items 6a of the injection molding machine 2 and the operation items 6b of the peripheral equipment 3 in respective display configurations different by the process class as fourth discriminatory indications 74a.

As shown in FIG. 12, in Embodiment 8, the column at the opposite side to the table side of the table T1f out of the columns adjacent to the column in which the second discriminatory indications 10 are displayed located at the opposite side to the table side of the table T1f is eliminated, and the fourth discriminatory indications 74a for discriminating the process class including the external setup and the internal setup are realized by making a part of the table T1f different in display configuration.

In the present embodiment, the display section 44 displays the operation items 6a of the injection molding machine 2 included in the setup operation 6 of the injection molding machine 2 and the operation items 6b of the peripheral equipment 3 included in the setup operation 6 of the injection molding machine 2 in the column located at the table side in the table T1f, and at the same time, displays a background of a cell with light hatching as the fourth discriminatory indication 74a in the cells corresponding to the external setup, and displays a background of a cell with a white color without hatching as the fourth discriminatory indication 74a in the cells corresponding to the internal setup. In other words, in the column located at the table side in the table T1f, the cells corresponding to the external setup and the cells corresponding to the internal setup are displayed with the respective hatching different from each other as the display configurations different by the process class corresponding to the operation item 6a, 6b to be displayed in each of the cells.

For example, in the present embodiment, DRYING MATERIAL out of the operation items 6b of the peripheral equipment 3 corresponds to the external setup, and therefore, the background of a cell 60f for displaying DRYING MATERIAL is displayed with the light hatching in the column located at the table side of the table T1f. Further, for example, since ATTACHING TEMPERATURE CONTROL MACHINE, LOWERING TEMPERATURE OF MANIFOLD, and WASTE SHOT correspond to the internal setup, the background of cells 60g, 60h, and 60j corresponding to the respective operations is displayed with a white color without hatching.

It should be noted that the display configurations different from each other are not limited to the variation of the hatching in the cells, and it is possible to use any variations in display configuration such as a variation in background color of the cells, a variation in frame border, a variation in font or color of characters and numbers displayed in the cells, or addition of a symbol such as an icon. Further, although in the present embodiment, the display configuration of the cells in the column located at the table side in the table T1f is varied as the fourth discriminatory indications 74a, it is possible to vary, for example, the display configuration of the row including the cell in the column located at the table side in the table T1f besides the cell in the column located at the table side in the table T1f.

According to the present embodiment, the following advantages can be obtained in addition to the advantages in Embodiment 7.

By the display section 44 displaying the operation items 6a of the injection molding machine 2 and the operation items 6b of the peripheral equipment 3 in the display configuration different by the process class as the fourth discriminatory indications 74a for discriminating the process class, it is possible for the operator to visually discriminate each of the operation items 6a, 6b between the external setup and the internal setup with ease and certainty, and thus, the work efficiency increases.

9. Embodiment 9

Then, a control screen W1g displayed by the display section 44 of the molding machine control system 1 according to Embodiment 9 will be described with reference to FIG. 13. It should be noted that constituents substantially the same as in Embodiment 1 are denoted by the same reference symbols, and the description thereof will be omitted. The control screen W1g related to Embodiment 9 includes a table T1g. Embodiment 9 is substantially the same as Embodiment 1 except the point that fifth discriminatory indications 75 representing an order relationship between the operation items 6a of the injection molding machine 2 and the operation items 6b of the peripheral equipment 3 in accordance with the execution sequence of the operation items 6a of the injection molding machine 2 and the operation items 6b of the peripheral equipment 3 are displayed in the table T1g.

Figure 13:
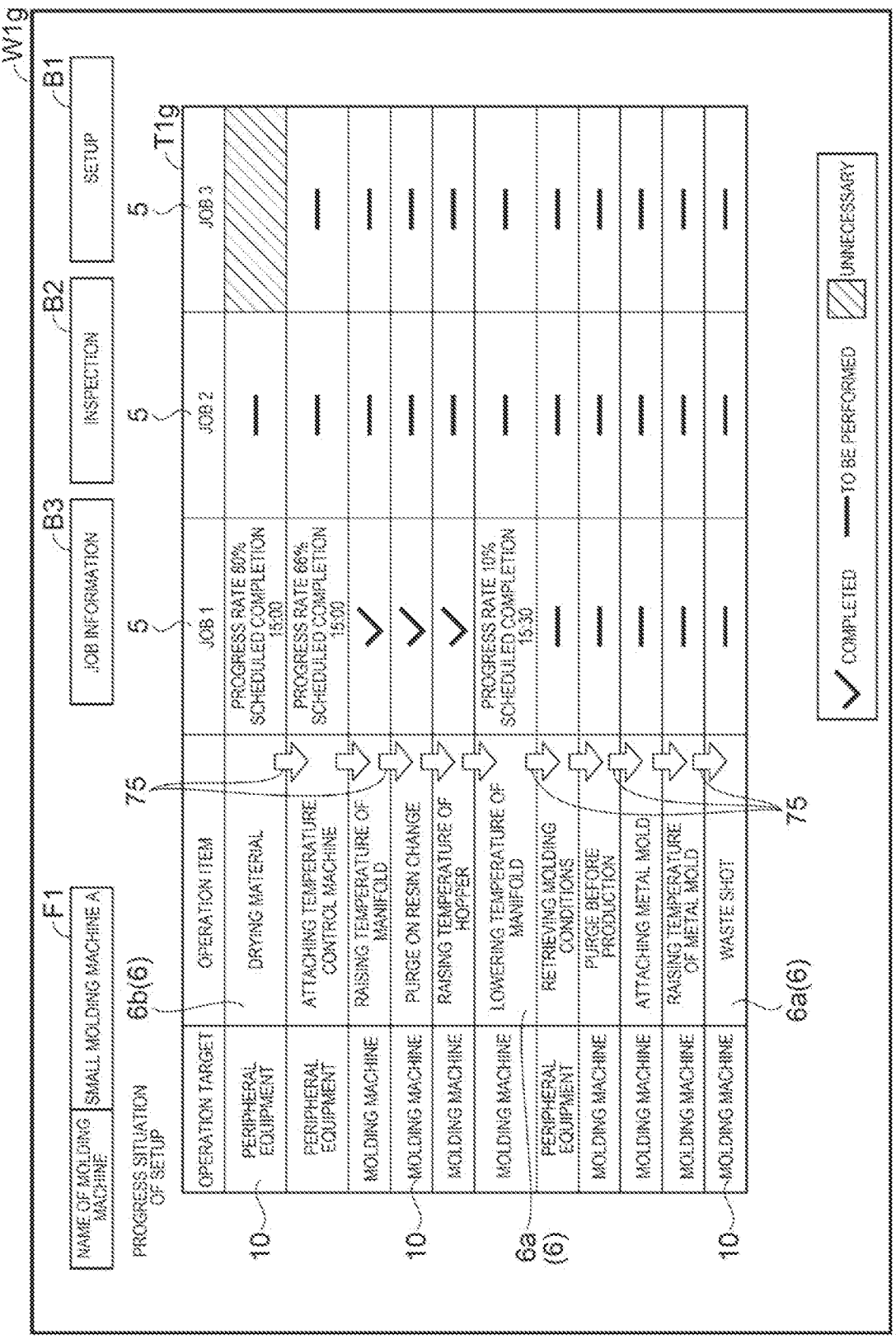
FIG. 13 is an explanatory diagram showing an example of a control screen displayed by a display section related to Embodiment 9.

As shown in FIG. 13, the display section 44 displays the fifth discriminatory indications 75. Specifically, in the present embodiment, the display section 44 displays arrows as symbols as the fifth discriminatory indications 75 so as to overlap the column located at the table side in the table T1g, namely the column in which the operation items 6a of the injection molding machine 2 and the operation items 6b of the peripheral equipment 3 are displayed.

It should be noted that the fifth discriminatory indications 75 can be symbols other than the arrows providing the fifth discriminatory indications 75 are indications representing the order relationship between the operation items 6a of the injection molding machine 2 and the operation items 6b of the peripheral equipment 3 in accordance with the execution sequence of the operation items 6a of the injection molding machine 2 and the operation items 6b of the peripheral equipment 3. The fifth discriminatory indications 75 can be display configurations other than the symbols. Further, the positions at which the fifth discriminatory indications 75 are displayed can be positions other than the column located at the table side in the table T1g.

According to the present embodiment, the following advantages can be obtained in addition to the advantages in Embodiment 1.

By the display section 44 displaying the fifth discriminatory indications 75 representing the order relationship between the operation items 6a of the injection molding machine 2 and the operation items 6b of the peripheral equipment 3 in accordance with the execution sequence of the operation items 6a of the injection molding machine 2 and the operation items 6b of the peripheral equipment 3, it is possible for the operator to visually discriminate the execution sequence of the operation items 6a, 6b with ease and certainty, and thus, the work efficiency increases.

10. Embodiment 10

Then, a control screen W1h displayed by the display section 44 of the molding machine control system 1 according to Embodiment 10 will be described with reference to FIG. 14. It should be noted that constituents substantially the same as in Embodiment 1 are denoted by the same reference symbols, and the description thereof will be omitted. The control screen W1h related to Embodiment 10 includes a table T1h. Embodiment 10 is substantially the same as Embodiment 1 except the point that operation items 6c corresponding to post-setup out of the setup operation 6 of the injection molding machine are displayed in addition to the operation items 6a, 6b corresponding to pre-setup out of the setup operation 6 of the injection molding machine 2 in the table T1h.

As shown in FIG. 14, in a column located at the table side in the table T1h, there are displayed the operation items 6a of the injection molding machine 2 and the operation items 6b of the peripheral equipment 3 corresponding to the pre-setup out of the setup operation 6 of the injection molding machine 2, and the operation items 6c corresponding to the post-setup out of the setup operation 6 of the injection molding machine 2. In other words, the setup operation 6 of the injection molding machine 2 includes the operation items 6a, 6b as the pre-setup operation, and the operation items 6c as the post-setup operation, and the display section 44 displays the operation items 6a, 6b corresponding to the pre-setup operation and the operation items 6c corresponding to the post-setup operation as the setup operation 6 of the injection molding machine 2.

It should be noted that in the present embodiment, "LOWERING TEMPERATURE OF METAL MOLD" and "DETACHING METAL MOLD" as the operation items to the injection molding machine 2 are displayed as the operation items 6c, but LOWERING TEMPERATURE OF METAL MOLD and DETACHING METAL MOLD are an example of the operation corresponding to the post-setup out of the setup operation 6 of the injection molding machine 2. LOWERING TEMPERATURE OF METAL MOLD is an operation of cooling the metal mold 26 attached to the injection molding machine 2, and DETACHING METAL MOLD is an operation of detaching the metal mold 26 having been cooled from the injection molding machine 2. The operation items 6c corresponding to the post-setup out of the setup operation 6 of the injection molding machine 2 are not limited to LOWERING TEMPERATURE OF METAL MOLD and DETACHING METAL MOLD, and can include other operations. For example, although LOWERING TEMPERATURE OF METAL MOLD and DETACHING METAL MOLD are the operations to the injection molding machine 2, an operation to the peripheral equipment 3 can also be included.

As described above, by the display section 44 displaying the operation items 6a, 6b corresponding to the pre-setup operation and the operations 6c corresponding to the post-setup operation as the setup operation 6 of the injection molding machine 2, it is possible for the operator to also figure out the post-setup operation in addition to the pre-setup operation, and therefore, the work efficiency increases.

Further, in the present embodiment, the background of the cells of the operation items 6a, 6b corresponding to the pre-setup operation is displayed with a white color without hatching, and the background of the cells of the operation items 6c corresponding to the post-setup operation is displayed with the light hatching in the column located at the table side in the table T1h.

In such a manner, by displaying the operation items 6a, 6b corresponding to the pre-setup operation and the operation items 6c corresponding to the post-setup operation with the respective hatching as the display configurations different from each other in accordance with whether each of the operation items 6a, 6b, and 6c is the operation corresponding to the pre-setup operation or the operation corresponding to the post-setup operation, it is possible for the operator to visually discriminate each of the operation items 6a, 6b, and 6c between the pre-setup and the post-setup with ease and certainty, and thus, the work efficiency increases.

According to the present embodiment, the following advantages can be obtained in addition to the advantages in Embodiment 1.

The setup operation 6 of the injection molding machine 2 includes the pre-setup operation and the post-setup operation, and by the display section 44 displaying the operation items 6a, 6b as the pre-setup operation and the operation items 6c as the post-setup operation as the setup operation 6 of the injection molding machine 2, the work efficiency increases.

What is claimed is:

1. A molding machine control system comprising:
an injection molding machine configure to produce a molded article;
peripheral equipment configured to aid the injection molding machine;
a display configured to display information relating to the injection molding machine and the peripheral equipment;
a memory configured to store a program, first operation items for the injection molding machine, second operation items for the peripheral equipment, and a standard operation time of each of the first and second operation items; and a processor configured to execute the program so as to display on the display:
- a first column including the molding machine and the peripheral equipment;
- a second column including the first and second operation items in association with the molding machine and the peripheral equipment in the first column, the first operation items including:
  - raising a temperature of a manifold;
  - purge on resin change;
  - purge before production;
  - attaching a metal mold;
  - raising a temperature of the metal mold; and
  - wasting a shot,
  the second operation items including:
  - retrieving molding conditions;
  - drying a material for molding; and
  - attaching a temperature controller;
- a third column for first jobs performed by the molding machine and the peripheral equipment in association with the first and second operation items;
- a fourth column for second jobs performed by the molding machine and the peripheral equipment in association with the first and second operation items, the first jobs being respectively performed before the second jobs; and
- contents of the third and fourth columns based on the standard operation time in the memory, the contents being all of following contents:
  - a first job state indicating a completed job;
  - a second job state indicating a job to be scheduled to perform;
  - a third job state indicating an unnecessary job; and
  - a fourth job state indicating a scheduled completion time and a progress rate of each of the first and second jobs.

2. The molding machine control system according to claim 1, wherein
the processor is configured to cause the display to display in the second column:
- one of the first and second operation items relating to the molding machine in a first display configuration; and
- another one of the first and second operation items relating to the peripheral equipment in a second display configuration different from the first display configuration.

3. The molding machine control system according to claim 1, wherein
the processor is configured to cause the display to display in the second column:
- a first indicator of a manual operation next to corresponding one of the first and second operation items; and
- a second indicator of a machine operation next to corresponding another one of the first and second operation items.

4. The molding machine control system according to claim 3, wherein
the processor is configured to cause the display to display:
- a reception section configured to receive a selection of one of the first and second operation items corresponding to the manual operation; and
- an input section configured to input an operation status of the selected one of the first and second operation items.

5. The molding machine control system according to claim 1, wherein
the processor is configured to cause the display to display a fifth column including identifications of first and second process classes with respect to the first and second operation items.

6. The molding machine control system according to claim 5, wherein
the processor is configured to cause the display to display in in the second column:
- a first indication of the first process class next to corresponding one of of the first and second operation items; and
- a second indication of the second process class next to corresponding another one of the first and second operation items.

7. The molding machine control system according to claim 1, wherein
the processor is configured to cause the display to display, in the second column, information item representing an order relationship among the first and second operation items in accordance with an execution sequence of the first and second operation items.

8. The molding machine control system according to claim 1, wherein
the processor is configured to cause the display to display an inspection operation status item of the injection molding machine or the peripheral equipment.

* * * * *